US012339979B2

(12) United States Patent
Ionescu

(10) Patent No.: US 12,339,979 B2
(45) Date of Patent: Jun. 24, 2025

(54) HYPERVISOR-BASED INTERCEPTION OF MEMORY AND REGISTER ACCESSES

(71) Applicant: CrowdStrike, Inc., Sunnyvale, CA (US)

(72) Inventor: Ion-Alexandru Ionescu, Seattle, WA (US)

(73) Assignee: CrowdStrike, Inc., Sunnyvale, CA (US)

( * ) Notice: Subject to any disclaimer, the term of this patent is extended or adjusted under 35 U.S.C. 154(b) by 626 days.

(21) Appl. No.: 17/060,355

(22) Filed: Oct. 1, 2020

(65) Prior Publication Data

US 2021/0049292 A1    Feb. 18, 2021

Related U.S. Application Data

(63) Continuation-in-part of application No. 15/063,086, filed on Mar. 7, 2016, now Pat. No. 11,188,651.

(51) Int. Cl.
*G06F 21/62* (2013.01)
*G06F 3/06* (2006.01)
(Continued)

(52) U.S. Cl.
CPC ........ *G06F 21/6218* (2013.01); *G06F 3/0622* (2013.01); *G06F 3/0655* (2013.01);
(Continued)

(58) Field of Classification Search
None
See application file for complete search history.

(56) References Cited

U.S. PATENT DOCUMENTS 4,564,903 A * 1/1986 Guyette ............. G06F 9/45541
711/201
4,783,731 A * 11/1988 Miyazaki ................ G06F 9/468
711/149
(Continued)

FOREIGN PATENT DOCUMENTS

EP         3017392 A1    5/2016
WO   WO2012135192 A2   10/2012
WO   WO2013055499 A1    4/2013

OTHER PUBLICATIONS

Jin et al "H-SVM: Hardware-Assisted Secure Virtual Machines under a Vulnerable Hypervisor," IEEE Transactions on Computers, vol. 64, No. 10, Oct. 2015, pp. 2833-2846 (Year: 2015).*
(Continued)

*Primary Examiner* — Luu T Pham
*Assistant Examiner* — James J Wilcox
(74) *Attorney, Agent, or Firm* — Lee & Hayes, P.C.

(57) ABSTRACT

A security agent configured to initiate a security agent component as a hypervisor for a computing device is described herein. The security agent component may then determine pages of the memory which include identified memory locations and set privilege attributes of those pages to prevent specific types of access to the memory locations, such as executing code stored at a memory location. Also, the security agent component may refrain from setting intercepts for pages including a whitelisted memory location. Further, the security agent component may set intercepts for debug registers, note read operations from the operating system for those registers, and respond with operating-system-permitted values. Additionally, the security agent component may set intercepts for instructions for performing write operations on control registers.

18 Claims, 13 Drawing Sheets

(51) Int. Cl.
*G06F 9/455* (2018.01)
*G06F 21/54* (2013.01)
*G06F 21/55* (2013.01)
*G06F 21/56* (2013.01)
*G06F 21/53* (2013.01)

(52) U.S. Cl.
CPC ........ *G06F 3/0679* (2013.01); *G06F 9/45558* (2013.01); *G06F 21/54* (2013.01); *G06F 21/554* (2013.01); *G06F 21/566* (2013.01); *G06F 2009/45583* (2013.01); *G06F 2009/45587* (2013.01); *G06F 21/53* (2013.01); *G06F 2221/034* (2013.01)

(56) References Cited

U.S. PATENT DOCUMENTS

| | | | |
|---|---|---|---|
| 4,787,031 A | | 11/1988 | Karger et al. |
| 5,179,690 A | | 1/1993 | Ishikawa |
| 5,239,634 A | * | 8/1993 | Buch .................. G06F 13/1642 711/E12.013 |
| 5,414,851 A | * | 5/1995 | Brice, Jr. .................. G06F 9/52 710/36 |
| 5,774,686 A | | 6/1998 | Hammond et al. |
| 5,854,912 A | | 12/1998 | Mahalingaiah |
| 5,909,696 A | | 6/1999 | Reinhardt et al. |
| 5,940,876 A | | 8/1999 | Pickett |
| 6,000,002 A | * | 12/1999 | Bonitz ................ G06F 11/0757 710/262 |
| 6,044,430 A | | 3/2000 | Macdonald |
| 6,076,156 A | | 6/2000 | Pickett et al. |
| 6,154,818 A | | 11/2000 | Christie |
| 6,173,404 B1 | | 1/2001 | Colburn et al. |
| 6,226,749 B1 | | 5/2001 | Carloganu et al. |
| 6,275,879 B1 | | 8/2001 | Goodfellow |
| 6,408,386 B1 | | 6/2002 | Hammond et al. |
| 6,516,395 B1 | | 2/2003 | Christie |
| 6,711,673 B1 | | 3/2004 | Mitchell et al. |
| 6,807,622 B1 | | 10/2004 | McGrath |
| 6,823,433 B1 | | 11/2004 | Barnes et al. |
| 6,854,039 B1 | | 2/2005 | Strongin et al. |
| 6,880,068 B1 | | 4/2005 | McGrath |
| 6,889,312 B1 | | 5/2005 | McGrath et al. |
| 6,898,697 B1 | | 5/2005 | Gao et al. |
| 6,968,446 B1 | | 11/2005 | McGrath |
| 6,986,052 B1 | | 1/2006 | Mittal |
| 7,043,616 B1 | | 5/2006 | McGrath |
| 7,082,507 B1 | | 7/2006 | Christie et al. |
| 7,096,491 B2 | | 8/2006 | Cheng |
| 7,130,951 B1 | | 10/2006 | Christie et al. |
| 7,426,644 B1 | | 9/2008 | Strongin et al. |
| 7,464,255 B1 | | 12/2008 | Tan et al. |
| 7,478,237 B2 | | 1/2009 | Costea et al. |
| 7,493,498 B1 | | 2/2009 | Schmidt et al. |
| 7,496,727 B1 | | 2/2009 | Ludloff et al. |
| 7,561,571 B1 | | 7/2009 | Lovett |
| 7,571,318 B2 | | 8/2009 | Strongin et al. |
| 7,571,482 B2 | * | 8/2009 | Polyakov ............ G06F 21/566 709/201 |
| 7,633,955 B1 | | 12/2009 | Saraiya |
| 7,664,110 B1 | | 2/2010 | Lovett |
| 7,685,281 B1 | | 3/2010 | Saraiya |
| 7,818,808 B1 | | 10/2010 | Neiger et al. |
| 7,843,906 B1 | | 11/2010 | Chidambaram |
| 7,843,907 B1 | | 11/2010 | Abou-Emara |
| 7,860,097 B1 | | 12/2010 | Lovett |
| 7,860,961 B1 | | 12/2010 | Finkelstein |
| 7,865,893 B1 | * | 1/2011 | Omelyanchuk ..... G06F 9/45545 718/1 |
| 7,873,693 B1 | | 1/2011 | Mehrotra |
| 7,895,573 B1 | * | 2/2011 | Bhargava ............ G06F 21/566 717/120 |
| 7,895,655 B2 | * | 2/2011 | Saito ...................... G06F 21/52 726/21 |
| 7,953,903 B1 | | 5/2011 | Finkelstein |
| 7,990,994 B1 | | 8/2011 | Yeh |
| 7,992,144 B1 | * | 8/2011 | Hendel .................. G06F 9/5077 718/1 |
| 7,996,836 B1 | | 8/2011 | McCorkendale et al. |
| 8,065,712 B1 | * | 11/2011 | Cheng .................. H04L 63/105 726/4 |
| 8,117,554 B1 | * | 2/2012 | Grechishkin ....... G06F 9/45558 715/764 |
| 8,127,098 B1 | * | 2/2012 | Klaiber ............... G06F 9/45533 711/205 |
| 8,132,003 B2 | | 3/2012 | Durham et al. |
| 8,136,158 B1 | | 3/2012 | Sehr et al. |
| 8,145,785 B1 | | 3/2012 | Finkelstein |
| 8,176,336 B1 | * | 5/2012 | Mao .................. G06F 9/45558 713/189 |
| 8,250,653 B2 | | 8/2012 | Wang et al. |
| 8,266,633 B1 | * | 9/2012 | Saulsbury ........... G06F 9/45558 718/1 |
| 8,285,999 B1 | | 10/2012 | Ghose et al. |
| 8,341,736 B2 | * | 12/2012 | Reasor .................. G06F 21/566 713/165 |
| 8,353,031 B1 | * | 1/2013 | Rajan .................. G06F 9/45558 726/22 |
| 8,381,284 B2 | | 2/2013 | Dang et al. |
| 8,386,788 B2 | | 2/2013 | Kozuch et al. |
| 8,448,165 B1 | * | 5/2013 | Conover ............. G06F 9/45558 717/174 |
| 8,473,724 B1 | | 6/2013 | Kenville et al. |
| 8,490,086 B1 | * | 7/2013 | Cook ...................... G06F 21/53 718/1 |
| 8,510,369 B1 | | 8/2013 | Ekke et al. |
| 8,510,756 B1 | * | 8/2013 | Koryakin ............ G06F 9/45558 718/1 |
| 8,566,944 B2 | * | 10/2013 | Peinado ................ G06F 21/566 711/E12.001 |
| 8,607,009 B2 | | 12/2013 | Nicholas et al. |
| 8,621,628 B2 | * | 12/2013 | Zeitlin .................. G06F 21/566 726/26 |
| 8,656,482 B1 | * | 2/2014 | Tosa .................... G06F 9/45558 713/153 |
| 8,689,333 B2 | * | 4/2014 | Aziz .................... H04L 63/1491 726/24 |
| 8,738,860 B1 | * | 5/2014 | Griffin ................. G06F 12/0897 711/122 |
| 8,793,787 B2 | * | 7/2014 | Ismael .................. H04L 63/145 726/1 |
| 8,832,820 B2 | | 9/2014 | Barjatiya et al. |
| 8,832,829 B2 | * | 9/2014 | Manni .................. G06F 21/567 726/25 |
| 8,844,036 B2 | * | 9/2014 | Saidi .................... H04L 63/1416 726/1 |
| 8,850,571 B2 | * | 9/2014 | Staniford ............ G06F 9/45533 713/188 |
| 8,881,145 B2 | | 11/2014 | Chiueh |
| 8,881,282 B1 | * | 11/2014 | Aziz ...................... G06F 21/554 726/23 |
| 8,893,258 B2 | | 11/2014 | Rao et al. |
| 8,893,300 B2 | * | 11/2014 | Ramachandran ..... H04L 63/105 726/19 |
| 8,904,477 B2 | * | 12/2014 | Barton ................ G06F 21/6218 726/1 |
| 8,924,964 B2 | * | 12/2014 | Kodi .................... G06F 9/5027 718/1 |
| 8,938,723 B1 | * | 1/2015 | Tormasov .................. G06F 8/52 717/136 |
| 8,955,115 B2 | | 2/2015 | Sabetta et al. |
| 8,984,478 B2 | * | 3/2015 | Epstein ............... G06F 9/45558 717/110 |
| 8,990,944 B1 | * | 3/2015 | Singh ...................... G06F 21/53 726/24 |
| 8,990,946 B1 | * | 3/2015 | Yarykin .............. G06F 21/566 713/188 |
| 8,996,807 B2 | * | 3/2015 | Joshi .................... G06F 9/45558 711/100 |

(56) References Cited

U.S. PATENT DOCUMENTS

| | | | | |
|---|---|---|---|---|
| 8,997,219 | B2* | 3/2015 | Staniford | H04L 63/1491 726/22 |
| 9,003,402 | B1* | 4/2015 | Carbone | G06F 9/4484 718/1 |
| 9,003,533 | B1* | 4/2015 | Gummerman | G06F 21/566 707/685 |
| 9,009,822 | B1* | 4/2015 | Ismael | G06F 21/53 726/25 |
| 9,009,823 | B1* | 4/2015 | Ismael | G06F 21/53 726/22 |
| 9,009,836 | B1* | 4/2015 | Yarykin | G06F 9/45558 726/25 |
| 9,015,838 | B1* | 4/2015 | Northup | G06F 21/554 713/188 |
| 9,021,498 | B1* | 4/2015 | Thimmappa | G06F 9/5077 718/104 |
| 9,043,580 | B2 | 5/2015 | Henry et al. | |
| 9,047,463 | B2* | 6/2015 | Porras | H04L 63/10 |
| 9,053,216 | B1* | 6/2015 | Coleman | G06F 11/079 |
| 9,064,130 | B1* | 6/2015 | Asheghian | G06F 21/6281 |
| 9,075,720 | B2 | 7/2015 | Blinick et al. | |
| 9,087,189 | B1 | 7/2015 | Koeten et al. | |
| 9,088,569 | B2* | 7/2015 | Arroyo | H04L 63/10 |
| 9,092,625 | B1* | 7/2015 | Kashyap | G06F 21/52 |
| 9,104,544 | B1* | 8/2015 | Uchronski | G06F 3/0641 |
| 9,104,867 | B1* | 8/2015 | Thioux | G06F 21/566 |
| 9,128,743 | B1* | 9/2015 | Bondalapati | G06F 9/45558 |
| 9,135,038 | B1* | 9/2015 | Uchronski | G06F 9/5077 |
| 9,148,428 | B1* | 9/2015 | Banga | H04L 41/1425 |
| 9,159,035 | B1* | 10/2015 | Ismael | G06F 9/45558 |
| 9,171,146 | B2* | 10/2015 | Vipat | G06F 21/44 |
| 9,172,724 | B1* | 10/2015 | Reddy | G06F 9/45558 |
| 9,176,843 | B1* | 11/2015 | Ismael | G06N 20/00 |
| 9,177,153 | B1 | 11/2015 | Perrig et al. | |
| 9,178,904 | B1* | 11/2015 | Gangadharan | H04L 9/40 |
| 9,183,028 | B1* | 11/2015 | Brandwine | H04L 67/56 |
| 9,183,399 | B2 | 11/2015 | Muff et al. | |
| 9,201,677 | B2* | 12/2015 | Joshi | G06F 12/0871 |
| 9,203,855 | B1 | 12/2015 | Mooring et al. | |
| 9,203,862 | B1* | 12/2015 | Kashyap | G06F 21/552 |
| 9,213,567 | B2* | 12/2015 | Barde | G06F 9/45541 |
| 9,223,966 | B1* | 12/2015 | Satish | G06F 9/45558 |
| 9,223,972 | B1* | 12/2015 | Vincent | H04L 41/1425 |
| 9,223,980 | B1* | 12/2015 | Bao | H04L 63/1408 |
| 9,244,705 | B1* | 1/2016 | Bondalapati | G06F 9/45504 |
| 9,251,343 | B1* | 2/2016 | Vincent | G06F 21/575 |
| 9,262,635 | B2* | 2/2016 | Paithane | G06F 21/53 |
| 9,274,823 | B1* | 3/2016 | Koryakin | G06F 9/45558 |
| 9,274,839 | B2* | 3/2016 | Schluessler | G06F 9/5016 |
| 9,274,974 | B1* | 3/2016 | Chen | G06F 12/109 |
| 9,292,350 | B1 | 3/2016 | Pendharkar et al. | |
| 9,294,501 | B2* | 3/2016 | Mesdaq | H04L 63/145 |
| 9,300,686 | B2* | 3/2016 | Pidathala | G06F 21/562 |
| 9,300,693 | B1* | 3/2016 | Manmohan | G06F 9/45558 |
| 9,311,126 | B2* | 4/2016 | Edwards | G06F 21/56 |
| 9,317,452 | B1* | 4/2016 | Forschmiedt | G06F 9/45558 |
| 9,342,550 | B1* | 5/2016 | Manmohan | G06F 21/6218 |
| 9,354,906 | B1* | 5/2016 | Uchronski | G06F 9/5027 |
| 9,355,247 | B1* | 5/2016 | Thioux | G06F 21/53 |
| 9,356,944 | B1* | 5/2016 | Aziz | H04L 63/145 |
| 9,378,044 | B1* | 6/2016 | Gaurav | G06F 9/5077 |
| 9,383,934 | B1* | 7/2016 | Lukacs | G06F 3/0622 |
| 9,386,021 | B1* | 7/2016 | Pratt | G06F 9/45558 |
| 9,398,028 | B1 | 7/2016 | Karandikar et al. | |
| 9,424,058 | B1* | 8/2016 | Wasson | G06F 16/1752 |
| 9,424,155 | B1* | 8/2016 | Pizel | G06F 3/0619 |
| 9,430,646 | B1* | 8/2016 | Mushtaq | H04L 67/02 |
| 9,436,751 | B1* | 9/2016 | Serebrin | G06F 9/45558 |
| 9,438,634 | B1* | 9/2016 | Ross | H04L 63/02 |
| 9,460,284 | B1* | 10/2016 | Hajmasan | G06F 21/566 |
| 9,465,617 | B1* | 10/2016 | Warkentin | G06F 13/26 |
| 9,467,476 | B1* | 10/2016 | Shieh | G06F 21/554 |
| 9,501,137 | B2* | 11/2016 | Kruglick | G06F 1/3243 |
| 9,503,482 | B1 | 11/2016 | Hugenbruch et al. | |
| 9,531,735 | B1* | 12/2016 | Lukacs | G06F 9/542 |
| 9,536,084 | B1* | 1/2017 | Lukacs | G06F 9/45558 |
| 9,536,091 | B2* | 1/2017 | Paithane | G06F 21/566 |
| 9,542,554 | B1* | 1/2017 | Salsamendi | G06F 21/566 |
| 9,552,481 | B1* | 1/2017 | Guo | G06F 21/54 |
| 9,558,051 | B1* | 1/2017 | Taylor | G06F 9/45545 |
| 9,563,464 | B1* | 2/2017 | Ramasubramanian | G06F 9/54 |
| 9,563,569 | B2 | 2/2017 | Tsirkin | |
| 9,565,202 | B1* | 2/2017 | Kindlund | H04L 63/145 |
| 9,571,509 | B1* | 2/2017 | Satish | H04L 63/20 |
| 9,575,781 | B1* | 2/2017 | Suit | G06F 9/45558 |
| 9,594,598 | B1* | 3/2017 | Brouwer | G06F 9/4856 |
| 9,594,904 | B1* | 3/2017 | Jain | G06F 21/563 |
| 9,594,912 | B1* | 3/2017 | Thioux | G06F 21/577 |
| 9,596,261 | B1* | 3/2017 | Lukacs | H04L 63/145 |
| 9,600,664 | B1* | 3/2017 | Roth | G06F 21/554 |
| 9,612,966 | B2* | 4/2017 | Joshi | G06F 12/0875 |
| 9,613,211 | B1* | 4/2017 | Chen | G06F 21/566 |
| 9,619,393 | B1* | 4/2017 | B T | G06F 12/084 |
| 9,626,509 | B1* | 4/2017 | Khalid | G06F 21/53 |
| 9,628,507 | B2* | 4/2017 | Haq | G06F 21/564 |
| 9,639,379 | B1* | 5/2017 | Suit | G06F 9/48 |
| 9,648,045 | B2 | 5/2017 | Mooring et al. | |
| 9,652,615 | B1* | 5/2017 | Watson | H04L 63/1416 |
| 9,659,182 | B1* | 5/2017 | Roundy | G06F 21/6218 |
| 9,672,354 | B2* | 6/2017 | Lutas | G06F 9/45558 |
| 9,679,134 | B1* | 6/2017 | Jing | H04L 63/1408 |
| 9,680,805 | B1* | 6/2017 | Rodgers | H04L 63/0281 |
| 9,686,171 | B1* | 6/2017 | Vemuri | H04L 43/0876 |
| 9,690,606 | B1* | 6/2017 | Ha | G06F 9/45558 |
| 9,690,936 | B1* | 6/2017 | Malik | G06F 21/566 |
| 9,697,026 | B1* | 7/2017 | Liu | G06F 11/2035 |
| 9,747,172 | B2* | 8/2017 | Epstein | G06F 12/14 |
| 9,747,446 | B1* | 8/2017 | Pidathala | G06F 21/56 |
| 9,753,758 | B1* | 9/2017 | Oldenburg | H04L 41/122 |
| 9,754,109 | B1* | 9/2017 | Parker-Wood | G06F 21/6218 |
| 9,756,069 | B1* | 9/2017 | Li | G06F 21/562 |
| 9,792,131 | B1* | 10/2017 | Uchronski | G06F 9/45558 |
| 9,792,431 | B1 | 10/2017 | Dalal et al. | |
| 9,805,193 | B1* | 10/2017 | Salsamendi | G06F 21/566 |
| 9,811,658 | B2* | 11/2017 | Martini | G06F 21/566 |
| 9,824,209 | B1 | 11/2017 | Ismael et al. | |
| 9,846,588 | B2* | 12/2017 | Ghosh | G06F 9/45533 |
| 9,881,157 | B1 | 1/2018 | Lukacs et al. | |
| 9,912,681 | B1* | 3/2018 | Ismael | G06F 21/55 |
| 9,921,860 | B1* | 3/2018 | Banga | G06F 9/5077 |
| 9,921,978 | B1* | 3/2018 | Chan | G06F 3/0622 |
| 9,922,192 | B1* | 3/2018 | Kashyap | G06F 9/45533 |
| 9,934,376 | B1* | 4/2018 | Ismael | G06F 21/566 |
| 9,935,829 | B1* | 4/2018 | Miller | G06F 9/45558 |
| 9,942,268 | B1* | 4/2018 | Danileiko | H04L 63/1466 |
| 9,959,188 | B1* | 5/2018 | Krishnan | G06F 9/45533 |
| 9,959,214 | B1* | 5/2018 | Habusha | G06F 12/1027 |
| 9,959,224 | B1* | 5/2018 | Serebrin | G06F 13/24 |
| 9,973,531 | B1* | 5/2018 | Thioux | H04L 63/1466 |
| 9,996,279 | B2 | 6/2018 | Gonzalez Diaz et al. | |
| 9,996,370 | B1* | 6/2018 | Khafizov | G06F 11/301 |
| 10,033,747 | B1* | 7/2018 | Paithane | G06F 21/566 |
| 10,033,759 | B1* | 7/2018 | Kabra | G06F 21/629 |
| 10,049,211 | B1* | 8/2018 | Lukacs | G06F 21/566 |
| 10,051,008 | B2 | 8/2018 | Mooring et al. | |
| 10,061,915 | B1* | 8/2018 | Roth | G06F 21/50 |
| 10,095,530 | B1* | 10/2018 | Banga | G06F 9/45504 |
| 10,103,959 | B2 | 10/2018 | Klein | |
| 10,104,185 | B1 | 10/2018 | Sharifi Mehr et al. | |
| 10,116,688 | B1* | 10/2018 | Yun | G06F 21/566 |
| 10,133,863 | B2* | 11/2018 | Bu | G06F 21/567 |
| 10,140,454 | B1* | 11/2018 | Spath | G06F 21/577 |
| 10,152,600 | B2 | 12/2018 | Rozas et al. | |
| 10,162,665 | B1* | 12/2018 | Eidelman | G06F 9/45558 |
| 10,181,034 | B2 | 1/2019 | Harrison et al. | |
| 10,192,052 | B1* | 1/2019 | Singh | G06F 21/562 |
| 10,210,031 | B2* | 2/2019 | Chiueh | G06F 9/45533 |
| 10,242,185 | B1* | 3/2019 | Goradia | G06F 21/552 |
| 10,303,879 | B1* | 5/2019 | Potlapally | G06F 21/57 |
| 10,310,696 | B1* | 6/2019 | Taylor | G06F 9/451 |
| 10,417,025 | B2* | 9/2019 | Bosch | H04L 67/51 |
| 10,423,435 | B1 | 9/2019 | Khafizov et al. | |
| 10,440,000 | B2 | 10/2019 | Kumar et al. | |

(56) References Cited

U.S. PATENT DOCUMENTS

| | | | |
|---|---|---|---|
| 10,445,516 B1* | 10/2019 | Mao | G06F 21/51 |
| 10,452,837 B1* | 10/2019 | Roth | G06F 9/45558 |
| 10,474,589 B1 | 11/2019 | Raskin | |
| 10,474,813 B1* | 11/2019 | Ismael | G06F 21/54 |
| 10,491,574 B1* | 11/2019 | Jung | H04L 63/10 |
| 10,515,019 B1* | 12/2019 | Iyigun | G06F 12/1009 |
| 10,515,214 B1* | 12/2019 | Vincent | G06F 21/562 |
| 10,540,524 B2* | 1/2020 | Dementiev | G06F 21/79 |
| 10,616,127 B1* | 4/2020 | Suit | G06F 9/5077 |
| 10,642,501 B1* | 5/2020 | Patel | G06F 9/4411 |
| 10,684,908 B2* | 6/2020 | Poledna | G06F 11/1004 |
| 10,846,145 B2* | 11/2020 | Xu | G06F 13/4282 |
| 10,963,280 B2* | 3/2021 | Kaplan | G06F 9/45558 |
| 11,003,577 B2* | 5/2021 | Kazama | G06F 12/0893 |
| 11,120,406 B2* | 9/2021 | Mody | G06Q 10/107 |
| 11,150,927 B1 | 10/2021 | Sharifi Mehr et al. | |
| 11,227,056 B2* | 1/2022 | Tang | G06F 21/6218 |
| 11,593,482 B2* | 2/2023 | Ahmed | G06F 21/566 |
| 11,635,960 B2* | 4/2023 | DeHon | G06F 12/1458 712/220 |
| 11,640,689 B1* | 5/2023 | Nikitenko | G06F 9/45545 345/506 |
| 11,783,055 B2* | 10/2023 | Hoogerbrugge | G06N 3/063 713/193 |
| 12,057,959 B2* | 8/2024 | Konda | H04L 63/1425 |
| 2001/0044891 A1 | 11/2001 | McGrath et al. | |
| 2002/0019902 A1 | 2/2002 | Christie | |
| 2002/0124194 A1* | 9/2002 | Dawkins | G06F 9/442 713/310 |
| 2002/0169979 A1 | 11/2002 | Zimmer | |
| 2002/0194389 A1 | 12/2002 | William et al. | |
| 2003/0033507 A1 | 2/2003 | McGrath | |
| 2003/0093579 A1 | 5/2003 | Zimmer et al. | |
| 2003/0093686 A1 | 5/2003 | Barnes et al. | |
| 2003/0126349 A1 | 7/2003 | Nalawadi et al. | |
| 2003/0135504 A1 | 7/2003 | Elvanoglu et al. | |
| 2004/0117539 A1 | 6/2004 | Bennett et al. | |
| 2004/0123288 A1 | 6/2004 | Bennett et al. | |
| 2005/0027914 A1 | 2/2005 | Hammalund et al. | |
| 2005/0076186 A1 | 4/2005 | Traut | |
| 2005/0223199 A1 | 10/2005 | Grochowski et al. | |
| 2005/0228631 A1 | 10/2005 | Maly et al. | |
| 2005/0228980 A1 | 10/2005 | Brokish et al. | |
| 2005/0246453 A1* | 11/2005 | Erlingsson | G06F 9/45558 710/1 |
| 2006/0010282 A1* | 1/2006 | Kim | G06F 11/1417 714/E11.133 |
| 2006/0026385 A1* | 2/2006 | Dinechin | G06F 12/1036 711/206 |
| 2006/0026577 A1* | 2/2006 | Dinechin | G06F 8/65 717/148 |
| 2006/0064567 A1* | 3/2006 | Jacobson | G06F 12/1036 711/E12.068 |
| 2006/0075402 A1 | 4/2006 | Neiger et al. | |
| 2006/0136608 A1 | 6/2006 | Gilbert et al. | |
| 2006/0161719 A1 | 7/2006 | Bennett et al. | |
| 2006/0161918 A1 | 7/2006 | Giers | |
| 2006/0206892 A1* | 9/2006 | Vega | G06F 9/4843 718/1 |
| 2006/0242700 A1 | 10/2006 | Fischer et al. | |
| 2006/0282624 A1* | 12/2006 | Yokota | G06F 9/468 711/147 |
| 2007/0022474 A1* | 1/2007 | Rowett | H04L 63/0218 726/11 |
| 2007/0022479 A1* | 1/2007 | Sikdar | H04L 63/0218 726/25 |
| 2007/0028244 A1* | 2/2007 | Landis | G06F 9/4555 718/108 |
| 2007/0050763 A1* | 3/2007 | Kagan | G06F 13/12 718/1 |
| 2007/0050764 A1* | 3/2007 | Traut | G06F 9/45558 718/1 |
| 2007/0061441 A1* | 3/2007 | Landis | G06F 9/4555 709/224 |
| 2007/0074208 A1* | 3/2007 | Ling | G06F 9/45558 718/1 |
| 2007/0079090 A1 | 4/2007 | Rajagopal et al. | |
| 2007/0156978 A1 | 7/2007 | Dixon et al. | |
| 2007/0180436 A1 | 8/2007 | Travostino et al. | |
| 2007/0261102 A1* | 11/2007 | Spataro | G06F 21/604 726/2 |
| 2007/0266389 A1* | 11/2007 | Ganguly | G06F 9/45558 718/104 |
| 2007/0300219 A1* | 12/2007 | Devaux | G06F 9/4555 718/1 |
| 2008/0005297 A1* | 1/2008 | Kjos | H04L 67/08 709/223 |
| 2008/0016570 A1* | 1/2008 | Capalik | H04L 63/1416 726/23 |
| 2008/0028461 A1 | 1/2008 | Pouliot | |
| 2008/0040715 A1* | 2/2008 | Cota-Robles | G06F 11/348 718/1 |
| 2008/0046679 A1 | 2/2008 | Bennett et al. | |
| 2008/0072223 A1* | 3/2008 | Cowperthwaite | G06F 9/545 718/1 |
| 2008/0077767 A1 | 3/2008 | Khosravi et al. | |
| 2008/0082772 A1 | 4/2008 | Savagaonkar et al. | |
| 2008/0114985 A1 | 5/2008 | Savagaonkar et al. | |
| 2008/0148259 A1 | 6/2008 | Hankins et al. | |
| 2008/0163254 A1* | 7/2008 | Cota-Robles | G06F 9/45558 719/318 |
| 2008/0163366 A1 | 7/2008 | Chinya et al. | |
| 2008/0184373 A1 | 7/2008 | Traut et al. | |
| 2008/0222309 A1* | 9/2008 | Shanbhogue | G06F 21/554 709/250 |
| 2008/0244155 A1 | 10/2008 | Lee et al. | |
| 2008/0250222 A1* | 10/2008 | Gokhale | G06F 9/45558 711/E12.068 |
| 2008/0271014 A1* | 10/2008 | Serebrin | G06F 9/45558 718/1 |
| 2008/0320594 A1* | 12/2008 | Jiang | G06F 21/566 726/24 |
| 2009/0037682 A1* | 2/2009 | Armstrong | G06F 9/45558 718/1 |
| 2009/0037908 A1* | 2/2009 | Armstrong | G06F 12/1475 718/1 |
| 2009/0037936 A1* | 2/2009 | Serebrin | G06F 12/0292 719/318 |
| 2009/0037941 A1* | 2/2009 | Armstrong | G06F 9/45558 719/328 |
| 2009/0044274 A1* | 2/2009 | Budko | G06F 9/45558 718/1 |
| 2009/0063835 A1* | 3/2009 | Yao | G06F 9/45558 713/2 |
| 2009/0070760 A1 | 3/2009 | Khatri et al. | |
| 2009/0083522 A1 | 3/2009 | Boggs et al. | |
| 2009/0113425 A1* | 4/2009 | Ports | G06F 9/4881 718/1 |
| 2009/0119087 A1* | 5/2009 | Ang | G06F 9/45558 703/23 |
| 2009/0119748 A1* | 5/2009 | Yao | G06F 21/57 726/2 |
| 2009/0133016 A1* | 5/2009 | Brown | G06F 9/45558 718/1 |
| 2009/0138729 A1 | 5/2009 | Hashimoto et al. | |
| 2009/0164709 A1 | 6/2009 | Lee et al. | |
| 2009/0172328 A1 | 7/2009 | Sahita et al. | |
| 2009/0182928 A1* | 7/2009 | Becker | G06F 9/45558 718/1 |
| 2009/0183173 A1* | 7/2009 | Becker | G06F 9/45533 719/313 |
| 2009/0198862 A1* | 8/2009 | Okitsu | G06F 9/5088 710/316 |
| 2009/0204964 A1* | 8/2009 | Foley | G06F 21/53 718/1 |
| 2009/0204965 A1* | 8/2009 | Tanaka | G06F 9/45558 718/1 |

(56) References Cited

U.S. PATENT DOCUMENTS

| | | | |
|---|---|---|---|
| 2009/0210888 A1* | 8/2009 | Lee | G06F 9/45558 |
| | | | 719/321 |
| 2009/0216984 A1* | 8/2009 | Gainey, Jr. | G06F 9/45537 |
| | | | 711/E12.002 |
| 2009/0217098 A1* | 8/2009 | Farrell | G06F 11/073 |
| | | | 714/E11.178 |
| 2009/0217264 A1* | 8/2009 | Heller | G06F 9/45558 |
| | | | 718/1 |
| 2009/0228673 A1 | 9/2009 | Waters et al. | |
| 2009/0249053 A1* | 10/2009 | Zimmer | G06F 9/45558 |
| | | | 713/2 |
| 2009/0254990 A1* | 10/2009 | McGee | G06F 21/50 |
| | | | 726/22 |
| 2009/0259875 A1* | 10/2009 | Check | G06F 9/45558 |
| | | | 712/E9.028 |
| 2009/0288167 A1* | 11/2009 | Freericks | G06F 21/554 |
| | | | 726/23 |
| 2009/0313445 A1* | 12/2009 | Pandey | G06F 9/5033 |
| | | | 711/E12.001 |
| 2009/0327576 A1* | 12/2009 | Oshins | G06F 9/45533 |
| | | | 719/321 |
| 2009/0328035 A1* | 12/2009 | Ganguly | G06F 9/542 |
| | | | 718/1 |
| 2009/0328074 A1* | 12/2009 | Oshins | G06F 9/45537 |
| | | | 719/321 |
| 2010/0023666 A1* | 1/2010 | Mansell | G06F 9/45558 |
| | | | 718/1 |
| 2010/0031325 A1* | 2/2010 | Maigne | G06F 21/53 |
| | | | 718/1 |
| 2010/0031360 A1 | 2/2010 | Seshadri | |
| 2010/0064117 A1 | 3/2010 | Henry et al. | |
| 2010/0088771 A1* | 4/2010 | Heller | G06F 11/3466 |
| | | | 718/1 |
| 2010/0094613 A1* | 4/2010 | Biles | G06F 9/45558 |
| | | | 718/1 |
| 2010/0131729 A1 | 5/2010 | Fulcheri et al. | |
| 2010/0161875 A1* | 6/2010 | Chang | G06F 9/4552 |
| | | | 718/1 |
| 2010/0169948 A1 | 7/2010 | Budko et al. | |
| 2010/0169968 A1 | 7/2010 | Shanbhogue et al. | |
| 2010/0191889 A1 | 7/2010 | Serebrin | |
| 2010/0199351 A1* | 8/2010 | Protas | G06F 21/577 |
| | | | 718/1 |
| 2010/0223447 A1* | 9/2010 | Serebrin | G06F 12/1027 |
| | | | 712/225 |
| 2010/0223612 A1* | 9/2010 | Osisek | G06F 9/45558 |
| | | | 718/1 |
| 2010/0235645 A1 | 9/2010 | Henry et al. | |
| 2010/0241734 A1* | 9/2010 | Miyajima | G06F 9/45558 |
| | | | 718/1 |
| 2010/0241974 A1* | 9/2010 | Rubin | G06F 3/0484 |
| | | | 715/764 |
| 2010/0242039 A1* | 9/2010 | Noguchi | G06F 13/102 |
| | | | 718/1 |
| 2010/0250230 A1 | 9/2010 | Ganguly et al. | |
| 2010/0250824 A1* | 9/2010 | Belay | G06F 9/45558 |
| | | | 718/1 |
| 2010/0250869 A1* | 9/2010 | Adams | G06F 12/0802 |
| | | | 718/1 |
| 2010/0250895 A1* | 9/2010 | Adams | G06F 12/1036 |
| | | | 718/1 |
| 2010/0251235 A1* | 9/2010 | Ganguly | G06F 9/45558 |
| | | | 718/1 |
| 2010/0251363 A1* | 9/2010 | Todorovic | G06F 21/56 |
| | | | 718/1 |
| 2010/0262722 A1* | 10/2010 | Vauthier | G06F 9/45558 |
| | | | 718/1 |
| 2010/0262743 A1 | 10/2010 | Zimmer et al. | |
| 2010/0281273 A1* | 11/2010 | Lee | F04B 33/00 |
| | | | 713/193 |
| 2010/0299665 A1 | 11/2010 | Adams | |
| 2010/0306456 A1* | 12/2010 | Schmidberger | G11C 16/349 |
| | | | 711/E12.001 |
| 2010/0313201 A1* | 12/2010 | Warton | G06F 9/45558 |
| | | | 718/1 |
| 2011/0010533 A1 | 1/2011 | Buford et al. | |
| 2011/0016508 A1 | 1/2011 | Wallace | |
| 2011/0047542 A1* | 2/2011 | Dang | G06F 21/52 |
| | | | 718/1 |
| 2011/0047543 A1* | 2/2011 | Mohinder | G06F 21/53 |
| | | | 718/1 |
| 2011/0055469 A1 | 3/2011 | Natu et al. | |
| 2011/0067105 A1* | 3/2011 | Wolfe | G06F 21/53 |
| | | | 718/1 |
| 2011/0078361 A1* | 3/2011 | Chen | G06F 9/45558 |
| | | | 718/1 |
| 2011/0082962 A1* | 4/2011 | Horovitz | G06F 11/301 |
| | | | 718/1 |
| 2011/0102443 A1* | 5/2011 | Dror | G06T 1/20 |
| | | | 345/522 |
| 2011/0107331 A1 | 5/2011 | Evans et al. | |
| 2011/0141124 A1 | 6/2011 | Halls et al. | |
| 2011/0145916 A1* | 6/2011 | McKenzie | G06F 21/79 |
| | | | 718/1 |
| 2011/0153909 A1* | 6/2011 | Dong | G06F 9/45558 |
| | | | 711/6 |
| 2011/0153926 A1 | 6/2011 | Fang et al. | |
| 2011/0154133 A1* | 6/2011 | Ganti | G06F 11/0778 |
| | | | 718/1 |
| 2011/0167195 A1* | 7/2011 | Scales | G06F 11/1484 |
| | | | 718/1 |
| 2011/0173251 A1* | 7/2011 | Sandhu | G06F 9/455 |
| | | | 709/203 |
| 2011/0197004 A1 | 8/2011 | Serebrin et al. | |
| 2011/0197190 A1* | 8/2011 | Hattori | G06F 9/30189 |
| | | | 718/1 |
| 2011/0202917 A1* | 8/2011 | Laor | G06F 9/45558 |
| | | | 718/1 |
| 2011/0202919 A1 | 8/2011 | Hayakawa et al. | |
| 2011/0219208 A1 | 9/2011 | Asaad | |
| 2011/0219447 A1 | 9/2011 | Horovitz et al. | |
| 2011/0225458 A1* | 9/2011 | Zuo | G06F 11/362 |
| | | | 718/1 |
| 2011/0225624 A1* | 9/2011 | Sawhney | G06F 9/45558 |
| | | | 718/1 |
| 2011/0231839 A1* | 9/2011 | Bennett | G06F 3/0683 |
| | | | 718/1 |
| 2011/0239213 A1* | 9/2011 | Aswani | G06F 9/45558 |
| | | | 718/1 |
| 2011/0239306 A1 | 9/2011 | Avni et al. | |
| 2011/0246171 A1* | 10/2011 | Cleeton | G06F 9/45558 |
| | | | 718/1 |
| 2011/0246986 A1* | 10/2011 | Nicholas | G06F 9/45545 |
| | | | 718/1 |
| 2011/0265082 A1* | 10/2011 | Ashok | G06F 9/45558 |
| | | | 718/1 |
| 2011/0295984 A1* | 12/2011 | Kunze | G06F 11/3409 |
| | | | 709/220 |
| 2011/0296412 A1* | 12/2011 | Banga | G06F 9/45545 |
| | | | 718/1 |
| 2011/0302577 A1* | 12/2011 | Reuther | G06F 9/45558 |
| | | | 718/1 |
| 2011/0307681 A1* | 12/2011 | Piry | G06F 9/384 |
| | | | 711/E12.058 |
| 2011/0307888 A1* | 12/2011 | Raj | G06F 21/74 |
| | | | 718/1 |
| 2011/0320413 A1* | 12/2011 | Roman | G06F 8/70 |
| | | | 707/690 |
| 2011/0320652 A1* | 12/2011 | Craddock | G06F 21/85 |
| | | | 710/64 |
| 2011/0320682 A1* | 12/2011 | McDougall | G06F 9/45504 |
| | | | 711/6 |
| 2011/0320772 A1* | 12/2011 | Craddock | G06F 9/30003 |
| | | | 712/205 |
| 2011/0321158 A1* | 12/2011 | Craddock | G06F 9/468 |
| | | | 726/20 |

(56) References Cited

U.S. PATENT DOCUMENTS

| | | |
|---|---|---|
| 2012/0023494 A1* | 1/2012 | Harrison ............... G06F 21/78 718/1 |
| 2012/0030518 A1 | 2/2012 | Rajwar et al. |
| 2012/0030731 A1* | 2/2012 | Bhargava ............... H04L 63/10 726/3 |
| 2012/0042034 A1* | 2/2012 | Goggin ............... G06F 3/0647 709/216 |
| 2012/0042145 A1 | 2/2012 | Sehr et al. |
| 2012/0047313 A1 | 2/2012 | Sinha et al. |
| 2012/0047369 A1 | 2/2012 | Henry et al. |
| 2012/0054740 A1* | 3/2012 | Chakraborty ....... G06F 9/45558 718/1 |
| 2012/0054741 A1* | 3/2012 | Ali ..................... G06F 9/45545 718/1 |
| 2012/0054744 A1* | 3/2012 | Singh ................. G06F 21/6218 718/1 |
| 2012/0066681 A1* | 3/2012 | Levy ................... G06F 9/45558 718/1 |
| 2012/0072638 A1* | 3/2012 | Grubb ................ G06F 11/366 711/6 |
| 2012/0075314 A1* | 3/2012 | Malakapalli ............ G06T 1/20 718/1 |
| 2012/0079164 A1* | 3/2012 | Hakewill ............ G06F 12/1009 711/6 |
| 2012/0079267 A1* | 3/2012 | Lee ..................... H04L 67/02 713/156 |
| 2012/0079479 A1* | 3/2012 | Hakewill ............ G06F 9/45558 718/1 |
| 2012/0102258 A1* | 4/2012 | Hepkin ............... G06F 12/0811 711/6 |
| 2012/0102334 A1 | 4/2012 | O'Loughlin et al. |
| 2012/0131309 A1* | 5/2012 | Johnson ................... G06F 8/40 712/E9.004 |
| 2012/0131575 A1* | 5/2012 | Yehuda .............. G06F 9/45558 718/1 |
| 2012/0144489 A1 | 6/2012 | Jarrett et al. |
| 2012/0151117 A1* | 6/2012 | Tuch ................... G06F 9/45558 711/6 |
| 2012/0173842 A1* | 7/2012 | Frey .................... G06F 9/45558 711/207 |
| 2012/0179855 A1* | 7/2012 | Tsirkin ................ G06F 9/45558 711/6 |
| 2012/0180042 A1* | 7/2012 | Tsirkin ................ G06F 9/45558 718/1 |
| 2012/0185688 A1* | 7/2012 | Thornton ............... G06F 9/4406 713/100 |
| 2012/0198278 A1 | 8/2012 | Williams |
| 2012/0216281 A1* | 8/2012 | Uner ..................... G06F 21/51 726/23 |
| 2012/0222015 A1* | 8/2012 | Bennett ............... G06F 11/3688 717/127 |
| 2012/0227045 A1 | 9/2012 | Knauth et al. |
| 2012/0233434 A1* | 9/2012 | Starks ................. G06F 9/45558 711/170 |
| 2012/0233608 A1 | 9/2012 | Toeroe |
| 2012/0240181 A1 | 9/2012 | McCorkendale et al. |
| 2012/0246641 A1* | 9/2012 | Gehrmann .......... G06F 9/45533 718/1 |
| 2012/0254982 A1* | 10/2012 | Sallam ................. G06F 21/566 726/16 |
| 2012/0254993 A1* | 10/2012 | Sallam ................. G06F 9/45558 718/1 |
| 2012/0254994 A1* | 10/2012 | Sallam ................. G06F 21/554 726/22 |
| 2012/0254995 A1* | 10/2012 | Sallam ................... G06F 21/52 726/22 |
| 2012/0254999 A1* | 10/2012 | Sallam ................. G06F 21/566 726/23 |
| 2012/0255000 A1* | 10/2012 | Sallam ................. G06F 21/566 726/23 |
| 2012/0255001 A1* | 10/2012 | Sallam ................. G06F 21/566 726/23 |
| 2012/0255002 A1* | 10/2012 | Sallam ................. G06F 21/566 726/23 |
| 2012/0255003 A1 | 10/2012 | Sallam |
| 2012/0255004 A1 | 10/2012 | Sallam |
| 2012/0255010 A1* | 10/2012 | Sallam ................ H04L 63/0227 726/24 |
| 2012/0255011 A1 | 10/2012 | Sallam |
| 2012/0255012 A1 | 10/2012 | Sallam |
| 2012/0255013 A1 | 10/2012 | Sallam |
| 2012/0255014 A1 | 10/2012 | Sallam |
| 2012/0255016 A1* | 10/2012 | Sallam ................. G06F 21/566 726/24 |
| 2012/0255017 A1* | 10/2012 | Sallam ................. G06F 9/45558 726/24 |
| 2012/0255018 A1* | 10/2012 | Sallam ................. G06F 21/566 726/24 |
| 2012/0255021 A1* | 10/2012 | Sallam ................. G06F 21/564 726/25 |
| 2012/0255031 A1* | 10/2012 | Sallam ................... G06F 21/53 726/27 |
| 2012/0260065 A1 | 10/2012 | Henry et al. |
| 2012/0278525 A1* | 11/2012 | Serebrin ............. G06F 12/1027 711/6 |
| 2012/0278800 A1* | 11/2012 | Nicholas ............. G06F 9/45558 718/1 |
| 2012/0290702 A1* | 11/2012 | Vincent ................ G06F 9/5077 709/223 |
| 2012/0297057 A1* | 11/2012 | Ghosh ................ G06F 9/45558 709/224 |
| 2012/0311307 A1 | 12/2012 | Chynoweth et al. |
| 2012/0317570 A1* | 12/2012 | Dalcher ................. G06F 21/53 718/1 |
| 2012/0317585 A1* | 12/2012 | Elko ................... G06F 9/45558 719/313 |
| 2012/0324236 A1* | 12/2012 | Srivastava ............ H04L 9/3234 713/189 |
| 2012/0324442 A1* | 12/2012 | Barde ................. G06F 9/45558 718/1 |
| 2012/0331464 A1* | 12/2012 | Saito .................. G06F 9/45533 718/1 |
| 2013/0007469 A1 | 1/2013 | Aratsu et al. |
| 2013/0007470 A1 | 1/2013 | Violleau et al. |
| 2013/0031291 A1* | 1/2013 | Edwards ............... G06F 21/64 711/6 |
| 2013/0031292 A1* | 1/2013 | Van Riel ............... G06F 12/10 711/6 |
| 2013/0031293 A1* | 1/2013 | Van Riel ............. G06F 9/45545 711/6 |
| 2013/0042115 A1 | 2/2013 | Sweet et al. |
| 2013/0055256 A1* | 2/2013 | Banga ................ G06F 9/45533 718/1 |
| 2013/0055340 A1 | 2/2013 | Kanai et al. |
| 2013/0061096 A1* | 3/2013 | McCoy ................ G06F 11/366 714/45 |
| 2013/0067199 A1 | 3/2013 | Henry et al. |
| 2013/0067245 A1 | 3/2013 | Horovitz et al. |
| 2013/0081142 A1* | 3/2013 | McDougal ............. G06F 21/577 726/24 |
| 2013/0086299 A1* | 4/2013 | Epstein ............... G06F 9/44563 711/6 |
| 2013/0086550 A1* | 4/2013 | Epstein ................. G06F 9/455 717/110 |
| 2013/0086581 A1* | 4/2013 | Frazier .................. G06F 9/462 718/1 |
| 2013/0091318 A1* | 4/2013 | Bhattacharjee ....... G06F 12/145 711/6 |
| 2013/0091500 A1* | 4/2013 | Earl .................... G06F 9/45558 718/1 |
| 2013/0091543 A1 | 4/2013 | Wade et al. |
| 2013/0091568 A1* | 4/2013 | Sharif ................. G06F 21/6227 726/22 |
| 2013/0097356 A1* | 4/2013 | Dang .................... G06F 21/53 711/6 |
| 2013/0107872 A1 | 5/2013 | Lovett |
| 2013/0117766 A1 | 5/2013 | Bax |

(56) References Cited

U.S. PATENT DOCUMENTS

| | | | |
|---|---|---|---|
| 2013/0117848 A1* | 5/2013 | Golshan | G06F 9/45558 726/23 |
| 2013/0117849 A1* | 5/2013 | Golshan | G06F 21/53 726/23 |
| 2013/0132691 A1* | 5/2013 | Banga | G06F 21/53 711/E12.103 |
| 2013/0133061 A1* | 5/2013 | Fainkichen | G06F 9/45529 726/15 |
| 2013/0138863 A1* | 5/2013 | Tsirkin | G06F 12/0284 711/6 |
| 2013/0145375 A1* | 6/2013 | Kang | G06F 9/5055 718/104 |
| 2013/0148669 A1* | 6/2013 | Noguchi | G06F 9/45558 370/401 |
| 2013/0152207 A1* | 6/2013 | Cui | G06F 21/53 726/26 |
| 2013/0160084 A1* | 6/2013 | Hansen | G06F 21/6218 726/4 |
| 2013/0160114 A1* | 6/2013 | Greenwood | G06F 21/6218 726/21 |
| 2013/0167149 A1* | 6/2013 | Mitsugi | G06F 9/455 718/1 |
| 2013/0174144 A1* | 7/2013 | Cheng | G06T 1/20 718/1 |
| 2013/0174148 A1* | 7/2013 | Amit | G06F 9/327 718/1 |
| 2013/0179892 A1* | 7/2013 | Frazier | G06F 9/45558 718/104 |
| 2013/0185720 A1* | 7/2013 | Tuch | G06F 12/02 718/1 |
| 2013/0185721 A1* | 7/2013 | Ikegami | G06F 9/45558 718/1 |
| 2013/0185737 A1* | 7/2013 | Farrell | G06F 9/45558 719/318 |
| 2013/0185739 A1* | 7/2013 | Farrell | G06F 9/54 719/318 |
| 2013/0191824 A1* | 7/2013 | Muff | G06F 9/3806 718/1 |
| 2013/0219389 A1 | 8/2013 | Serebrin et al. | |
| 2013/0227559 A1* | 8/2013 | Tsirkin | G06F 9/45558 718/1 |
| 2013/0227568 A1 | 8/2013 | Anderson | |
| 2013/0229421 A1* | 9/2013 | Cheng | G09G 5/363 345/522 |
| 2013/0232238 A1* | 9/2013 | Cohn | H04W 12/08 709/220 |
| 2013/0237204 A1* | 9/2013 | Buck | G01S 19/16 455/418 |
| 2013/0246995 A1 | 9/2013 | Ferrão et al. | |
| 2013/0257594 A1* | 10/2013 | Collins | G06K 7/01 340/10.1 |
| 2013/0276056 A1* | 10/2013 | Epstein | G06F 21/604 726/1 |
| 2013/0276057 A1 | 10/2013 | Smith et al. | |
| 2013/0283370 A1 | 10/2013 | Vipat et al. | |
| 2013/0312098 A1 | 11/2013 | Aditya | |
| 2013/0312099 A1 | 11/2013 | Edwards | |
| 2013/0316754 A1* | 11/2013 | Skog | H04W 24/08 455/517 |
| 2013/0326504 A1* | 12/2013 | Tsirkin | G06F 9/45558 718/1 |
| 2013/0326625 A1* | 12/2013 | Anderson | G06F 21/566 726/23 |
| 2013/0333033 A1* | 12/2013 | Khesin | G06F 21/55 726/23 |
| 2013/0333040 A1* | 12/2013 | Diehl | G06F 9/46 726/22 |
| 2013/0339960 A1* | 12/2013 | Greiner | G06F 9/3834 718/101 |
| 2013/0340077 A1* | 12/2013 | Salsamendi | G06F 21/554 718/1 |
| 2013/0347095 A1* | 12/2013 | Barjatiya | H04L 63/065 726/13 |
| 2013/0347131 A1* | 12/2013 | Mooring | G06F 21/556 726/29 |
| 2014/0006661 A1 | 1/2014 | Chappell et al. | |
| 2014/0006734 A1* | 1/2014 | Li | G06F 9/45558 711/E12.103 |
| 2014/0006804 A1* | 1/2014 | Tkacik | G06F 9/45558 713/192 |
| 2014/0007091 A1* | 1/2014 | Arges | G06F 9/4837 718/1 |
| 2014/0032758 A1* | 1/2014 | Barton | H04L 41/00 709/225 |
| 2014/0033266 A1 | 1/2014 | Kim et al. | |
| 2014/0033271 A1* | 1/2014 | Barton | H04W 12/64 726/1 |
| 2014/0053272 A1* | 2/2014 | Lukacs | G06F 21/53 718/1 |
| 2014/0059302 A1* | 2/2014 | Hayakawa | G06F 3/0673 711/153 |
| 2014/0059642 A1 | 2/2014 | Deasy et al. | |
| 2014/0068601 A1* | 3/2014 | Simms | G06F 21/53 718/1 |
| 2014/0068612 A1* | 3/2014 | Torrey | G06F 9/45558 718/1 |
| 2014/0089916 A1* | 3/2014 | Gross | G06F 11/0727 718/1 |
| 2014/0096131 A1* | 4/2014 | Sonnek | G06F 21/53 718/1 |
| 2014/0096134 A1* | 4/2014 | Barak | G06F 21/566 718/1 |
| 2014/0101402 A1* | 4/2014 | Gschwind | G06F 12/1036 711/173 |
| 2014/0101406 A1* | 4/2014 | Gschwind | G06F 12/1045 711/207 |
| 2014/0101657 A1* | 4/2014 | Bacher | G06F 9/45558 718/1 |
| 2014/0104287 A1 | 4/2014 | Nalluri et al. | |
| 2014/0115652 A1* | 4/2014 | Kapoor | H04L 63/20 726/1 |
| 2014/0115701 A1 | 4/2014 | Moshchuk et al. | |
| 2014/0130158 A1* | 5/2014 | Wang | G06F 21/566 726/23 |
| 2014/0137114 A1* | 5/2014 | Bolte | G06F 9/45533 718/1 |
| 2014/0149634 A1* | 5/2014 | Tosatti | G06F 9/45558 711/6 |
| 2014/0149779 A1* | 5/2014 | Allen-Ware | G06F 11/3013 713/340 |
| 2014/0149795 A1* | 5/2014 | Musha | G06F 11/22 714/30 |
| 2014/0156872 A1 | 6/2014 | Buer et al. | |
| 2014/0157258 A1* | 6/2014 | Dow | G06F 16/137 718/1 |
| 2014/0165056 A1* | 6/2014 | Ghai | G06F 11/202 718/1 |
| 2014/0173169 A1 | 6/2014 | Liu et al. | |
| 2014/0173293 A1 | 6/2014 | Kaplan | |
| 2014/0181533 A1 | 6/2014 | Boivie et al. | |
| 2014/0189194 A1 | 7/2014 | Sahita et al. | |
| 2014/0189687 A1* | 7/2014 | Jung | G06F 21/53 718/1 |
| 2014/0195484 A1* | 7/2014 | Wang | G06F 9/45558 707/624 |
| 2014/0215467 A1* | 7/2014 | Niesser | G06F 9/52 718/1 |
| 2014/0229938 A1* | 8/2014 | Tsirkin | G06F 13/26 718/1 |
| 2014/0229943 A1 | 8/2014 | Tian et al. | |
| 2014/0230077 A1* | 8/2014 | Muff | G06F 9/45558 726/30 |
| 2014/0237586 A1 | 8/2014 | Itani | |
| 2014/0244949 A1* | 8/2014 | Abali | G06F 11/1484 711/162 |
| 2014/0245444 A1* | 8/2014 | Lutas | G06F 21/56 726/24 |

(56) References Cited

U.S. PATENT DOCUMENTS

| | | | |
|---|---|---|---|
| 2014/0245446 A1 | 8/2014 | Shanmugavelayutham et al. | |
| 2014/0250286 A1* | 9/2014 | Kondo | G06F 9/45558 711/170 |
| 2014/0258663 A1 | 9/2014 | Zeng et al. | |
| 2014/0258716 A1* | 9/2014 | MacMillan | G06F 21/53 713/164 |
| 2014/0258720 A1* | 9/2014 | Black | G06F 21/6218 713/165 |
| 2014/0281469 A1* | 9/2014 | Ali | G06F 9/45558 713/2 |
| 2014/0281694 A1* | 9/2014 | Gotsubo | G06F 11/30 714/6.32 |
| 2014/0282507 A1* | 9/2014 | Plondke | G06F 9/45533 718/1 |
| 2014/0282526 A1* | 9/2014 | Basavaiah | H04L 67/59 718/1 |
| 2014/0282539 A1* | 9/2014 | Sonnek | G06F 9/45558 718/1 |
| 2014/0282542 A1 | 9/2014 | Smith et al. | |
| 2014/0282543 A1* | 9/2014 | Ignatchenko | G06F 9/45558 718/1 |
| 2014/0283036 A1 | 9/2014 | Salamat et al. | |
| 2014/0283040 A1 | 9/2014 | Wilkerson | |
| 2014/0283056 A1* | 9/2014 | Bachwani | G06F 9/45558 726/23 |
| 2014/0283077 A1* | 9/2014 | Gallella | G06F 21/53 726/24 |
| 2014/0298003 A1* | 10/2014 | Ali | G06F 9/4416 713/2 |
| 2014/0304814 A1* | 10/2014 | Ott | G06F 40/253 726/22 |
| 2014/0317731 A1 | 10/2014 | Ionescu | |
| 2014/0317745 A1* | 10/2014 | Kolbitsch | G06F 21/566 726/24 |
| 2014/0325681 A1* | 10/2014 | Kleidermacher | G06F 21/575 726/29 |
| 2014/0337558 A1* | 11/2014 | Powers | G06F 13/42 710/313 |
| 2014/0337836 A1* | 11/2014 | Ismael | H04L 63/145 718/1 |
| 2014/0351930 A1 | 11/2014 | Sun et al. | |
| 2014/0358972 A1* | 12/2014 | Guarrieri | G06F 16/21 707/781 |
| 2014/0359229 A1* | 12/2014 | Cota-Robles | G06F 9/45558 711/143 |
| 2014/0372719 A1 | 12/2014 | Lange et al. | |
| 2014/0372751 A1 | 12/2014 | Silverstone | |
| 2014/0373005 A1* | 12/2014 | Agrawal | G06F 9/45558 718/1 |
| 2014/0379955 A1* | 12/2014 | Dong | G06F 12/1009 711/6 |
| 2014/0379956 A1* | 12/2014 | Chang | G06F 9/45558 711/6 |
| 2015/0013008 A1* | 1/2015 | Lukacs | G06F 21/53 726/24 |
| 2015/0026807 A1* | 1/2015 | Lutas | G06F 12/1009 711/6 |
| 2015/0032946 A1 | 1/2015 | Goss et al. | |
| 2015/0033227 A1* | 1/2015 | Lin | G06F 9/45533 718/1 |
| 2015/0033305 A1* | 1/2015 | Shear | G06F 21/53 726/11 |
| 2015/0039891 A1* | 2/2015 | Ignatchenko | H04L 63/0853 718/1 |
| 2015/0046425 A1* | 2/2015 | Lin | G06F 16/9535 707/769 |
| 2015/0046908 A1* | 2/2015 | Salsamendi | G06F 11/3644 717/129 |
| 2015/0052519 A1* | 2/2015 | Yu | G06F 21/53 718/1 |
| 2015/0052607 A1 | 2/2015 | Al Hamami | |
| 2015/0058619 A1 | 2/2015 | Sweet et al. | |
| 2015/0058997 A1* | 2/2015 | Lee | G06F 9/45558 726/26 |
| 2015/0067672 A1* | 3/2015 | Mitra | G06F 9/5077 718/1 |
| 2015/0074665 A1* | 3/2015 | Kamino | G06F 13/4027 718/1 |
| 2015/0082305 A1* | 3/2015 | Hepkin | G06F 21/53 718/1 |
| 2015/0095548 A1* | 4/2015 | Tsirkin | G06F 9/45545 711/6 |
| 2015/0096022 A1* | 4/2015 | Vincent | G06F 21/562 726/23 |
| 2015/0096025 A1* | 4/2015 | Ismael | G06F 21/566 726/23 |
| 2015/0100791 A1* | 4/2015 | Chen | G06F 21/6218 713/189 |
| 2015/0101049 A1* | 4/2015 | Lukacs | H04L 63/14 726/23 |
| 2015/0106572 A1 | 4/2015 | Stone et al. | |
| 2015/0121135 A1* | 4/2015 | Pape | G06F 11/0712 718/1 |
| 2015/0121366 A1* | 4/2015 | Neiger | G06F 9/4555 718/1 |
| 2015/0121449 A1* | 4/2015 | Cp | G06F 21/566 726/1 |
| 2015/0128266 A1* | 5/2015 | Tosa | G06F 21/566 726/23 |
| 2015/0143055 A1* | 5/2015 | Guthrie | G06F 12/0855 711/135 |
| 2015/0143362 A1* | 5/2015 | Lukacs | G06F 9/4843 718/1 |
| 2015/0143374 A1* | 5/2015 | Banga | G06F 21/00 718/1 |
| 2015/0146715 A1* | 5/2015 | Olivier | H04L 69/40 370/352 |
| 2015/0146716 A1* | 5/2015 | Olivier | H04L 65/80 370/352 |
| 2015/0149997 A1* | 5/2015 | Tsirkin | G06F 12/063 718/1 |
| 2015/0160998 A1* | 6/2015 | Anvin | G06F 12/0817 714/807 |
| 2015/0161384 A1 | 6/2015 | Gu et al. | |
| 2015/0172300 A1* | 6/2015 | Cochenour | G06F 21/6218 726/23 |
| 2015/0178078 A1 | 6/2015 | Anvin et al. | |
| 2015/0178497 A1* | 6/2015 | Lukacs | G06F 9/461 718/108 |
| 2015/0199198 A1* | 7/2015 | Ven | G06F 12/1491 712/205 |
| 2015/0199514 A1* | 7/2015 | Tosa | G06F 21/53 726/17 |
| 2015/0199516 A1 | 7/2015 | Dalcher | |
| 2015/0199532 A1* | 7/2015 | Ismael | G06F 21/552 726/30 |
| 2015/0205962 A1* | 7/2015 | Swidowski | G06F 21/554 726/23 |
| 2015/0205964 A1* | 7/2015 | Eytan | G06F 21/566 726/23 |
| 2015/0220354 A1* | 8/2015 | Nair | G06F 13/28 710/308 |
| 2015/0220455 A1 | 8/2015 | Chen et al. | |
| 2015/0220745 A1* | 8/2015 | Nellitheertha | G06F 21/602 713/193 |
| 2015/0242233 A1* | 8/2015 | Brewerton | G06F 13/28 710/308 |
| 2015/0242628 A1* | 8/2015 | Burt | G06F 21/566 726/23 |
| 2015/0244730 A1* | 8/2015 | Vu | G06F 21/566 726/24 |
| 2015/0248554 A1* | 9/2015 | Dumitru | G06F 21/56 718/1 |
| 2015/0254017 A1* | 9/2015 | Soja | G06F 3/0622 711/163 |
| 2015/0261559 A1* | 9/2015 | Sliwa | G06F 9/5077 718/1 |

(56) References Cited

U.S. PATENT DOCUMENTS

| | | | |
|---|---|---|---|
| 2015/0261560 A1* | 9/2015 | Sliwa | G06F 9/5077 718/1 |
| 2015/0261690 A1 | 9/2015 | Epstein | |
| 2015/0261713 A1* | 9/2015 | Kuch | G06F 13/385 710/104 |
| 2015/0261952 A1* | 9/2015 | Sliwa | G06F 21/53 718/1 |
| 2015/0263993 A1* | 9/2015 | Kuch | H04L 49/354 709/225 |
| 2015/0268979 A1* | 9/2015 | Komarov | G06F 9/45533 711/145 |
| 2015/0269085 A1* | 9/2015 | Gainey, Jr. | G06F 11/3409 718/1 |
| 2015/0277872 A1* | 10/2015 | Gschwind | G06F 9/45516 717/153 |
| 2015/0277946 A1* | 10/2015 | Busaba | G06F 9/3009 718/1 |
| 2015/0277947 A1* | 10/2015 | Busaba | G06F 9/485 718/1 |
| 2015/0277948 A1* | 10/2015 | Bradbury | G06F 9/5077 718/1 |
| 2015/0278085 A1* | 10/2015 | Bybell | G06F 12/1063 711/205 |
| 2015/0278106 A1* | 10/2015 | Gschwind | G06F 9/45558 711/202 |
| 2015/0278126 A1 | 10/2015 | Maniatis et al. | |
| 2015/0281267 A1* | 10/2015 | Danahy | H04L 63/1416 726/23 |
| 2015/0286583 A1 | 10/2015 | Kanai | |
| 2015/0288659 A1* | 10/2015 | Lukacs | G06F 9/4416 713/2 |
| 2015/0288710 A1* | 10/2015 | Zeitlin | G06F 21/554 726/23 |
| 2015/0293774 A1* | 10/2015 | Persson | G06F 9/45558 718/1 |
| 2015/0293776 A1* | 10/2015 | Persson | G06F 9/50 718/1 |
| 2015/0294117 A1* | 10/2015 | Cucinotta | H04L 63/20 713/189 |
| 2015/0295945 A1* | 10/2015 | Canzanese, Jr. | G06F 21/55 726/23 |
| 2015/0301761 A1 | 10/2015 | Sijstermans et al. | |
| 2015/0304343 A1* | 10/2015 | Cabrera | G06F 21/50 726/23 |
| 2015/0317479 A1* | 11/2015 | Jiang | H04L 63/145 726/23 |
| 2015/0317495 A1* | 11/2015 | Rodgers | H04L 9/3247 713/192 |
| 2015/0319160 A1* | 11/2015 | Ferguson | H04L 63/12 726/10 |
| 2015/0326531 A1 | 11/2015 | Cui et al. | |
| 2015/0334126 A1* | 11/2015 | Mooring | G06F 9/45545 726/1 |
| 2015/0339475 A1* | 11/2015 | Feroz | G06F 21/566 726/23 |
| 2015/0339480 A1* | 11/2015 | Lutas | G06F 21/56 726/22 |
| 2015/0347052 A1* | 12/2015 | Grisenthwaite | G06F 3/0622 711/163 |
| 2015/0347166 A1* | 12/2015 | Noel | G06F 9/4856 718/1 |
| 2015/0356297 A1 | 12/2015 | Guri et al. | |
| 2015/0358309 A1 | 12/2015 | Edwards, Jr. et al. | |
| 2015/0358338 A1* | 12/2015 | Zeitlin | H04L 63/1416 726/23 |
| 2015/0363763 A1 | 12/2015 | Chang et al. | |
| 2015/0370590 A1* | 12/2015 | Tuch | G06F 9/461 718/1 |
| 2015/0370591 A1* | 12/2015 | Tuch | G06F 9/45558 718/1 |
| 2015/0370592 A1* | 12/2015 | Tuch | G06F 9/45558 718/1 |
| 2015/0371042 A1* | 12/2015 | Mooring | G06F 21/56 726/1 |
| 2015/0373023 A1 | 12/2015 | Walker | |
| 2015/0379265 A1* | 12/2015 | Lutas | G06F 21/55 726/23 |
| 2015/0381442 A1 | 12/2015 | Delgado et al. | |
| 2015/0381578 A1* | 12/2015 | Thota | H04L 9/14 713/168 |
| 2016/0004863 A1 | 1/2016 | Lazri et al. | |
| 2016/0011893 A1* | 1/2016 | Strong | G06F 9/45558 718/1 |
| 2016/0011895 A1* | 1/2016 | Tsirkin | G06F 9/461 718/1 |
| 2016/0021142 A1* | 1/2016 | Gafni | G06F 9/45558 726/23 |
| 2016/0029221 A1* | 1/2016 | Suarez Garcia | H04W 12/128 455/410 |
| 2016/0034295 A1 | 2/2016 | Cochran | |
| 2016/0034702 A1* | 2/2016 | Sikka | G06F 21/602 726/27 |
| 2016/0041881 A1* | 2/2016 | Simoncelli | G06F 11/1484 714/16 |
| 2016/0048458 A1* | 2/2016 | Lutas | G06F 21/53 711/163 |
| 2016/0048460 A1 | 2/2016 | Kadi et al. | |
| 2016/0048464 A1* | 2/2016 | Nakajima | G06F 9/5016 711/152 |
| 2016/0048680 A1* | 2/2016 | Lutas | G06F 12/1009 726/23 |
| 2016/0050071 A1 | 2/2016 | Collart et al. | |
| 2016/0055108 A1* | 2/2016 | Williamson | G06F 9/50 710/261 |
| 2016/0062784 A1 | 3/2016 | Chai et al. | |
| 2016/0063660 A1 | 3/2016 | Spector et al. | |
| 2016/0077847 A1* | 3/2016 | Hunter | G06F 13/20 718/1 |
| 2016/0077858 A1* | 3/2016 | Hunter | G06F 13/4221 710/104 |
| 2016/0077884 A1* | 3/2016 | Hunter | G06F 9/4411 718/104 |
| 2016/0077981 A1* | 3/2016 | Kegel | G06F 9/45558 710/48 |
| 2016/0077984 A1* | 3/2016 | Steinert | G06F 9/45558 710/309 |
| 2016/0078342 A1* | 3/2016 | Tang | H04L 41/00 706/47 |
| 2016/0085568 A1* | 3/2016 | Dupre | G06F 9/4812 718/1 |
| 2016/0092382 A1 | 3/2016 | Anvin et al. | |
| 2016/0094570 A1* | 3/2016 | Hunt | G06F 21/566 726/24 |
| 2016/0098273 A1* | 4/2016 | Bartik | G06F 11/30 712/228 |
| 2016/0098367 A1* | 4/2016 | Etsion | G06F 3/0611 710/308 |
| 2016/0099811 A1* | 4/2016 | Hawblitzel | H04L 9/3268 713/176 |
| 2016/0110291 A1* | 4/2016 | Gordon | G06F 9/5016 711/6 |
| 2016/0117183 A1* | 4/2016 | Baumeister | G06F 9/5077 718/1 |
| 2016/0117497 A1* | 4/2016 | Saxena | G06F 21/566 726/26 |
| 2016/0117498 A1* | 4/2016 | Saxena | G06F 21/445 726/26 |
| 2016/0124751 A1* | 5/2016 | Li | G06F 21/74 713/100 |
| 2016/0132349 A1* | 5/2016 | Bacher | G06F 9/542 718/1 |
| 2016/0135048 A1 | 5/2016 | Huxham et al. | |
| 2016/0139962 A1* | 5/2016 | Tsirkin | G06F 9/45558 718/1 |
| 2016/0147551 A1* | 5/2016 | Tsirkin | G06F 9/4555 718/1 |
| 2016/0147556 A1* | 5/2016 | Hu | G06F 9/45558 718/1 |

(56) References Cited

U.S. PATENT DOCUMENTS

| | | | |
|---|---|---|---|
| 2016/0148001 A1* | 5/2016 | Bacher | G06F 9/542 |
| | | | 713/189 |
| 2016/0154663 A1* | 6/2016 | Guthrie | G06F 11/1458 |
| | | | 718/1 |
| 2016/0156665 A1 | 6/2016 | Mooring et al. | |
| 2016/0162685 A1* | 6/2016 | Feroz | G06F 9/45558 |
| | | | 726/22 |
| 2016/0164880 A1* | 6/2016 | Colesa | G06F 21/53 |
| | | | 726/1 |
| 2016/0170769 A1* | 6/2016 | LeMay | G06F 9/30054 |
| | | | 713/190 |
| 2016/0170816 A1* | 6/2016 | Warkentin | G06F 9/544 |
| | | | 719/320 |
| 2016/0170881 A1* | 6/2016 | Guthrie | G06F 3/0652 |
| | | | 711/143 |
| 2016/0170912 A1* | 6/2016 | Warkentin | G06F 13/24 |
| | | | 726/17 |
| 2016/0179558 A1* | 6/2016 | Busaba | G06F 9/45545 |
| | | | 718/1 |
| 2016/0179564 A1 | 6/2016 | Chen et al. | |
| 2016/0179696 A1* | 6/2016 | Zmudzinski | G06F 12/1009 |
| | | | 711/163 |
| 2016/0180079 A1* | 6/2016 | Sahita | G06F 21/52 |
| | | | 726/22 |
| 2016/0180090 A1* | 6/2016 | Dalcher | G06F 21/566 |
| | | | 726/23 |
| 2016/0180115 A1 | 6/2016 | Yamada et al. | |
| 2016/0188353 A1* | 6/2016 | Shu | G06F 9/45558 |
| | | | 718/1 |
| 2016/0188354 A1* | 6/2016 | Goldsmith | G06F 12/1009 |
| | | | 718/1 |
| 2016/0188880 A1* | 6/2016 | Smith | G06F 21/577 |
| | | | 726/23 |
| 2016/0191521 A1* | 6/2016 | Feroz | G06F 16/9535 |
| | | | 726/1 |
| 2016/0191547 A1* | 6/2016 | Zafar | H04L 63/1416 |
| | | | 726/23 |
| 2016/0191550 A1* | 6/2016 | Ismael | H04L 63/1433 |
| | | | 726/1 |
| 2016/0196432 A1* | 7/2016 | Main | H04W 12/08 |
| | | | 726/1 |
| 2016/0202980 A1 | 7/2016 | Henry et al. | |
| 2016/0210069 A1* | 7/2016 | Lutas | G06F 3/0637 |
| 2016/0210179 A1 | 7/2016 | Hans | |
| 2016/0210465 A1* | 7/2016 | Craske | G06F 21/629 |
| 2016/0212620 A1 | 7/2016 | Paczkowski et al. | |
| 2016/0216982 A1* | 7/2016 | Variath | G06F 9/45558 |
| 2016/0224474 A1* | 8/2016 | Harriman | G06F 12/1009 |
| 2016/0224786 A1* | 8/2016 | Swidowski | H04L 63/1416 |
| 2016/0224789 A1* | 8/2016 | Feroz | G06F 9/45558 |
| 2016/0224794 A1 | 8/2016 | Roberts et al. | |
| 2016/0232354 A1* | 8/2016 | Fraser | G06F 21/554 |
| 2016/0232872 A1* | 8/2016 | Yoo | G06F 9/452 |
| 2016/0239323 A1* | 8/2016 | Tsirkin | G06F 9/45558 |
| 2016/0239328 A1* | 8/2016 | Kaplan | G06F 9/45558 |
| 2016/0239333 A1* | 8/2016 | Cowperthwaite | G06T 1/20 |
| 2016/0246630 A1* | 8/2016 | Tsirkin | H04L 63/104 |
| 2016/0246636 A1* | 8/2016 | Tsirkin | G06F 9/5077 |
| 2016/0246637 A1* | 8/2016 | Divakarla | G06F 16/955 |
| 2016/0246644 A1* | 8/2016 | Canton | G06F 9/45558 |
| 2016/0253110 A1* | 9/2016 | Tsirkin | G06F 9/45545 |
| | | | 711/162 |
| 2016/0253196 A1* | 9/2016 | van Riel | G06F 9/5016 |
| | | | 718/1 |
| 2016/0259750 A1* | 9/2016 | Keidar | G06F 13/4068 |
| 2016/0259939 A1* | 9/2016 | Bobritsky | G06F 16/245 |
| 2016/0283246 A1* | 9/2016 | Fleming | G06F 11/30 |
| 2016/0283258 A1* | 9/2016 | Bacher | G06F 9/45545 |
| 2016/0283259 A1* | 9/2016 | Mehta | G06F 9/45558 |
| 2016/0283260 A1* | 9/2016 | Bacher | G06F 9/45545 |
| 2016/0283404 A1 | 9/2016 | Xing et al. | |
| 2016/0283736 A1* | 9/2016 | Allen | G06F 3/0622 |
| 2016/0285638 A1 | 9/2016 | Pearson et al. | |
| 2016/0285913 A1 | 9/2016 | Itskin et al. | |
| 2016/0285970 A1* | 9/2016 | Cai | H04L 69/162 |
| 2016/0292816 A1* | 10/2016 | Dong | G06F 9/455 |
| 2016/0299712 A1 | 10/2016 | Kishan et al. | |
| 2016/0306643 A1* | 10/2016 | Klee | G06F 9/545 |
| 2016/0306749 A1* | 10/2016 | Tsirkin | G06F 9/45558 |
| 2016/0314009 A1* | 10/2016 | Tsirkin | G06F 9/45545 |
| 2016/0314309 A1 | 10/2016 | Rozak-Draicchio | |
| 2016/0321156 A1* | 11/2016 | Zhang | G06F 11/362 |
| 2016/0328254 A1* | 11/2016 | Ahmed | G06F 9/45545 |
| 2016/0328348 A1* | 11/2016 | Iba | G06F 9/45558 |
| 2016/0328561 A1* | 11/2016 | Tamir | G06F 21/552 |
| 2016/0328562 A1* | 11/2016 | Saxena | G06F 21/566 |
| 2016/0330215 A1* | 11/2016 | Gafni | H04L 63/14 |
| 2016/0335436 A1* | 11/2016 | Vipat | G06F 21/56 |
| 2016/0337329 A1 | 11/2016 | Sood et al. | |
| 2016/0350534 A1* | 12/2016 | Poornachandran | G06F 21/554 |
| 2016/0352518 A1 | 12/2016 | Ford et al. | |
| 2016/0357647 A1 | 12/2016 | Shirai et al. | |
| 2016/0359896 A1 | 12/2016 | Hay et al. | |
| 2016/0364304 A1* | 12/2016 | Hanumantharaya | G06F 11/2028 |
| 2016/0364338 A1 | 12/2016 | Zmudzinski et al. | |
| 2016/0364341 A1* | 12/2016 | Banginwar | G06F 9/485 |
| 2016/0364349 A1* | 12/2016 | Okada | G06F 9/5077 |
| 2016/0371105 A1* | 12/2016 | Sieffert | G06F 8/656 |
| 2016/0371106 A1* | 12/2016 | Hepkin | G06F 9/45545 |
| 2016/0378498 A1 | 12/2016 | Caprioli et al. | |
| 2016/0378522 A1* | 12/2016 | Kaplan | G06F 12/1036 |
| | | | 718/1 |
| 2016/0378527 A1* | 12/2016 | Zamir | G06F 9/45558 |
| | | | 711/162 |
| 2016/0378528 A1* | 12/2016 | Zamir | G06F 3/0679 |
| | | | 711/162 |
| 2016/0378684 A1 | 12/2016 | Zmudzinski et al. | |
| 2017/0004302 A1* | 1/2017 | Derbeko | G06F 9/45558 |
| 2017/0006057 A1 | 1/2017 | Perez Lafuente et al. | |
| 2017/0006060 A1* | 1/2017 | Venkataramani | H04W 12/122 |
| 2017/0010981 A1 | 1/2017 | Cambou | |
| 2017/0024560 A1 | 1/2017 | Linde | |
| 2017/0026181 A1 | 1/2017 | Chhabra et al. | |
| 2017/0031699 A1* | 2/2017 | Banerjee | G06F 12/0895 |
| 2017/0032119 A1* | 2/2017 | Dore | G06F 13/16 |
| 2017/0039080 A1* | 2/2017 | Chadha | G06F 9/45558 |
| 2017/0046187 A1* | 2/2017 | Tsirkin | G06F 9/45558 |
| 2017/0046212 A1* | 2/2017 | Fernandez | G06F 3/0617 |
| 2017/0046518 A1* | 2/2017 | Chen | G06F 21/566 |
| 2017/0060781 A1 | 3/2017 | Soja et al. | |
| 2017/0068575 A1 | 3/2017 | Hardage, Jr. et al. | |
| 2017/0083703 A1* | 3/2017 | Abbasi | G06F 21/561 |
| 2017/0091487 A1 | 3/2017 | LeMay | |
| 2017/0093578 A1 | 3/2017 | Zimmer et al. | |
| 2017/0097851 A1* | 4/2017 | Chen | G06F 9/45558 |
| 2017/0102957 A1* | 4/2017 | Marquardt | G06F 21/51 |
| 2017/0103201 A1* | 4/2017 | Fox | H04L 63/20 |
| 2017/0109189 A1* | 4/2017 | Swidowski | G06F 21/554 |
| 2017/0109251 A1* | 4/2017 | Das | G06F 9/45558 |
| 2017/0109525 A1 | 4/2017 | Sistany | |
| 2017/0109530 A1 | 4/2017 | Diehl et al. | |
| 2017/0123992 A1* | 5/2017 | Bradbury | G06F 12/0828 |
| 2017/0124326 A1 | 5/2017 | Wailly et al. | |
| 2017/0126677 A1* | 5/2017 | Kumar | H04L 63/0227 |
| 2017/0126706 A1* | 5/2017 | Minea | H04L 63/1408 |
| 2017/0126726 A1 | 5/2017 | Han | |
| 2017/0132156 A1* | 5/2017 | Axnix | G06F 9/45558 |
| 2017/0134176 A1 | 5/2017 | Kim et al. | |
| 2017/0139777 A1* | 5/2017 | Gehrmann | G06F 21/575 |
| 2017/0147370 A1* | 5/2017 | Williamson | G06F 9/45558 |
| 2017/0147819 A1* | 5/2017 | Vasilenko | G06F 11/3079 |
| 2017/0153987 A1* | 6/2017 | Gaonkar | G06F 12/145 |
| 2017/0161089 A1* | 6/2017 | Frazier | G06F 9/45558 |
| 2017/0168737 A1* | 6/2017 | Kumar | G06F 9/45558 |
| 2017/0168865 A1* | 6/2017 | Swidowski | G06F 11/34 |
| 2017/0171159 A1* | 6/2017 | Kumar | G06F 9/45558 |
| 2017/0177365 A1 | 6/2017 | Doshi et al. | |
| 2017/0177377 A1 | 6/2017 | Thiyagarajah et al. | |
| 2017/0177392 A1* | 6/2017 | Bacher | G06F 21/60 |
| 2017/0177398 A1 | 6/2017 | Bacher et al. | |
| 2017/0177415 A1 | 6/2017 | Dhanraj et al. | |

(56) References Cited

U.S. PATENT DOCUMENTS

| | | |
|---|---|---|
| 2017/0177429 A1 | 6/2017 | Stark et al. |
| 2017/0177441 A1* | 6/2017 | Chow .................. G06F 11/1407 |
| 2017/0177854 A1* | 6/2017 | Gligor ..................... G06F 21/44 |
| 2017/0177860 A1* | 6/2017 | Suarez ..................... G06F 21/53 |
| 2017/0177877 A1* | 6/2017 | Suarez ................. G06F 21/6218 |
| 2017/0177909 A1* | 6/2017 | Sarangdhar ............. G06F 21/85 |
| 2017/0180346 A1* | 6/2017 | Suarez ................. G06F 9/45558 |
| 2017/0185436 A1* | 6/2017 | Deng .................. G06F 9/45558 |
| 2017/0185529 A1* | 6/2017 | Chhabra ............... G06F 12/145 |
| 2017/0185536 A1* | 6/2017 | Li ........................... G06F 21/53 |
| 2017/0185784 A1 | 6/2017 | Madou et al. |
| 2017/0192801 A1* | 7/2017 | Barlev .................. G06F 9/4555 |
| 2017/0192810 A1* | 7/2017 | Lukacs ................... G06F 21/56 |
| 2017/0199768 A1* | 7/2017 | Arroyo ............... G06F 13/4282 |
| 2017/0206104 A1* | 7/2017 | Sliwa .................. G06F 9/45558 |
| 2017/0206175 A1* | 7/2017 | Sliwa .................. G06F 12/1408 |
| 2017/0206177 A1* | 7/2017 | Tsai .................... G06F 9/45558 |
| 2017/0213031 A1 | 7/2017 | Diehl et al. |
| 2017/0220369 A1* | 8/2017 | Kaplan ............... G06F 12/1045 |
| 2017/0220447 A1 | 8/2017 | Brandt |
| 2017/0220795 A1 | 8/2017 | Suginaka |
| 2017/0222815 A1* | 8/2017 | Meriac .................. H04L 9/3271 |
| 2017/0228271 A1* | 8/2017 | Tsirkin ................ G06F 11/0712 |
| 2017/0228535 A1 | 8/2017 | Shanbhogue et al. |
| 2017/0235966 A1* | 8/2017 | Ray ..................... G06F 21/6218<br>713/165 |
| 2017/0235967 A1* | 8/2017 | Ray ......................... G06F 21/56<br>713/165 |
| 2017/0243183 A1* | 8/2017 | Soeder ................. G06Q 20/382 |
| 2017/0249176 A1* | 8/2017 | Elias ................... G06F 9/44505 |
| 2017/0255778 A1 | 9/2017 | Ionescu |
| 2017/0257399 A1 | 9/2017 | Mooring et al. |
| 2017/0262306 A1* | 9/2017 | Wang ..................... G06F 9/5027 |
| 2017/0293581 A1* | 10/2017 | Villatel ................... G06F 21/78 |
| 2017/0323113 A1* | 11/2017 | El-Moussa ............. G06F 9/445 |
| 2017/0329623 A1* | 11/2017 | Dong ......................... G06T 1/20 |
| 2017/0331884 A1 | 11/2017 | Colle et al. |
| 2017/0353485 A1 | 12/2017 | Brown et al. |
| 2017/0364685 A1* | 12/2017 | Shah ....................... G06F 21/575 |
| 2018/0004868 A1* | 1/2018 | Adam ................. G06F 9/45558 |
| 2018/0011729 A1* | 1/2018 | Yu ........................... G06F 9/4843 |
| 2018/0033116 A1* | 2/2018 | Tian .......................... G06F 8/36 |
| 2018/0034781 A1 | 2/2018 | Jaeger et al. |
| 2018/0048660 A1* | 2/2018 | Paithane ............... G06F 21/566 |
| 2018/0139237 A1* | 5/2018 | Smith .................. H04L 63/1416 |
| 2018/0152469 A1* | 5/2018 | Smith .................. H04L 63/1433 |
| 2018/0165791 A1* | 6/2018 | Dong .................. G06F 12/0875 |
| 2018/0203805 A1 | 7/2018 | Hatta et al. |
| 2018/0248878 A1* | 8/2018 | El-Moussa ............. H04L 63/02 |
| 2018/0268130 A1* | 9/2018 | Ghosh ..................... G06F 21/53 |
| 2018/0285143 A1 | 10/2018 | Bacher et al. |
| 2018/0285561 A1* | 10/2018 | Frank ..................... G06F 9/4843 |
| 2018/0336348 A1 | 11/2018 | Ng et al. |
| 2018/0349162 A1* | 12/2018 | Tian ..................... G06F 9/45558 |
| 2018/0373556 A1* | 12/2018 | Tian ..................... G06F 9/45533 |
| 2018/0373570 A1* | 12/2018 | Xu ............................. G06T 1/20 |
| 2019/0005224 A1 | 1/2019 | Oliver et al. |
| 2019/0005267 A1 | 1/2019 | Soman et al. |
| 2019/0034633 A1* | 1/2019 | Seetharamaiah ... G06F 9/45558 |
| 2019/0163513 A1* | 5/2019 | Noorshams ......... G06F 9/45558 |
| 2019/0325133 A1 | 10/2019 | Goodridge et al. |
| 2020/0036602 A1 | 1/2020 | Leibovici et al. |
| 2020/0159558 A1 | 5/2020 | Bak et al. |
| 2020/0213355 A1* | 7/2020 | Ogan .................. H04L 63/1466 |
| 2020/0241902 A1* | 7/2020 | Freche ................. G06F 9/45545 |
| 2020/0319884 A1* | 10/2020 | Rohleder ............. G06F 11/302 |
| 2020/0394065 A1 | 12/2020 | Bak et al. |
| 2021/0026950 A1* | 1/2021 | Ionescu ............... G06F 9/30101 |
| 2021/0049028 A1 | 2/2021 | Price |
| 2021/0049292 A1* | 2/2021 | Ionescu ............... G06F 21/6218 |
| 2022/0358049 A1* | 11/2022 | Tsirkin .................... G06F 13/28 |
| 2023/0027826 A1* | 1/2023 | Sharma ................ G06F 11/2215 |
| 2023/0280930 A1* | 9/2023 | Song ....................... G06F 3/0604 |
| 2024/0005044 A1* | 1/2024 | Neve De Mevergnies ................<br>G06F 21/602 |
| 2024/0048593 A1* | 2/2024 | Hebert ................ H04L 63/1433 |

OTHER PUBLICATIONS

Kienzle et al "Endpoint Configuration Compliance Monitoring via Virtual Machine Introspection," Proceedings of the 43rd Hawaii International Conference on System Sciences, IEEE Computer Society, pp. 1-10 (Year: 2010).*

Nguyen et al "MAVMM: Lightweight and Purpose Built VMM for Malware Analysis," 2009 Annual Computer Security Applications Conference, IEEE Computer Society, pp. 441-450 (Year: 2009).*

Qingbo et al "System Monitoring and Controlling Mechanism based on Hypervisor," 2009 IEEE International Symposium on Parallel and Distributed Processing with Applications, IEEE Computer Society, pp. 549-554.*

Branco et al "Architecture for Automation of Malware Analysis," IEEE, pp. 106-112 (Year: 2010).*

Wen et al FVisor: Towards Thwarting Unauthorized File Accesses with a Light-Weight Hypervisor, 2014 IEEE 17th International Conference on Computational Science and Engineering, IEEE Computer Society, pp. 620-626 (Year: 2014).*

Hsiao et al "A Cooperative Botnet Profiling and Detection in Virtualized Environment," 2013 IEEE Conference on Communications and Network Security (CNS), pp. 154-162 (Year: 2013).*

Hsu et al "Divergence Detector: A Fine-grained Approach to Detecting VM-Awareness Malware," 2013 7th International Conference on Software Security and Reliability, IEEE Computer Society, pp. 80-89 (Year: 2013).*

Wong et al "Zygaria: Storage Performance as a Managed Resource," IEEE Computer Society, pp. 1-10 (Year: 2006).*

Wang et al "A Resource Allocation Model for Hybrid Storage Systems," 2015 15th IEEE/ACM International Symposium on Cluster, Cloud and Grid Computing, IEEE Computer Society, pp. 91-100 (Year: 2015).*

Hebbal et al "Virtual Machine Introspection: Techniques and Applications," 2015 10th International Conference on Availability, Reliability and Security, IEEE, pp. 676-685 (Year: 2015).*

Engdahl et al "Device Register Classes for Embedded Systems," 2011 11th International Conference on Control, Automation and Systems, pp. 773-778 (Year: 2011).*

The Extended European Search Report mailed Apr. 16, 2021 for European Patent Application No. 20206917.5, 10 pages.

Wang, et al., "Countering Kernel Rootkits with Lightweight Hook Protection", Computer and Communications Security, Nov. 9, 2009, pp. 545-554.

The European Office Action mailed on Jul. 25, 2019 for European U.S. Appl. No. 15/063,086, a counterpart of U.S. Appl. No. 15/063,086, 8 pages.

The Extended European Search Report mailed Jul. 13, 2017 for European patent application No. 17156043.6, 10 pages.

Office action for U.S. Appl. No. 15/063,086, mailed on Oct. 6, 2017, Ionescu, "Hypervisor-Based Interception of Memory Accesses", 36 pages.

Office action for U.S. Appl. No. 15/063,086, mailed on May 9, 2018, Ionescu, "Hypervisor-Based Interception of Memory Accesses", 27 pages.

Wen, et al., "FVisor: Towards Thwarting Unauthorized File Accesses with A Light-weght Hypervisor", 2014 IEEE 17th International Conference on Computational Science and Engineering, Dec. 2014, pp. 620-626.

Office Action for U.S. Appl. No. 17/062,237, mailed on Nov. 29, 2023, Ion-Alexandru Ionescu, "Hypervisor-Based Redirection of System Calls and Interrupt-Based Task Offloading", 23 pages.

Azab et al., "HIMA: A hypervisor-Based Integrity Measurement Agent", IEEE Computer Society, pp. 461.

Binun, et al., "Self-Stabilizing Virtual Machine Hypervisor Architecture for Resilent Cloud", 2014 IEEE 10th World Congress on Services, 2014, pp. 200-207.

(56) References Cited

OTHER PUBLICATIONS

Chiueh et al., "Surreptitious Depolyment and Execution of Kernel Agents in Windows Guiests", IEEE Computer Society, pp. 507-514.
Datta et al., "A Logic Secure Systems and its Application to Trusted Computing", IEEE Computer Society, pp. 221-236.
Huin, et al., "An Agent-Based Architecture to Add Security In a Cooperative Information System", Third International IEEE Conference on Signal-Image Technologies and Internet-Based System, 2008, pp. 262-271.
Kornaros et al., "Hardware Support for Cost-Effective System-Level Protection in Multi-Core SoCs", IEEE, pp. 41-48.
Moratelli, et al., "Hardware-Assisted Interrupt Delivery Optimization For Virtualized Embedded Platforms," IEEE, 2015, pp. 304-307.
Office Action for U.S. Appl. No. 17/062,237, mailed on May 25, 2023, lon-Alexandru Ionescu, "Hypervisor-Based Redirection of System Calls and Interrupt-Based Task Offloading", 18 pages.
Office Action for U.S. Appl. No. 17/062,237, mailed on Nov. 29, 2023, lon-Alexandru Ionescu, "Hypervisor-Based Redirection of System Calls and Interrupt-Based Task Offloading", 23 pages.
Pham, et al., "Reliability and Security Monitoring of Virtual Machines Using Hardware Architectural Invariants", 2014 44th Annual IEEE/IFIP International Conference on Dependable Systems and Networks, 2014, pp. 13-24.
Zhang, et al., "Formal Verification of Interrupt Injection in a Hypervisor," 2014 Theoretical Aspects of Software EngineeringConference, IEEE Computer Society, 2014, pp. 74-81.

\* cited by examiner

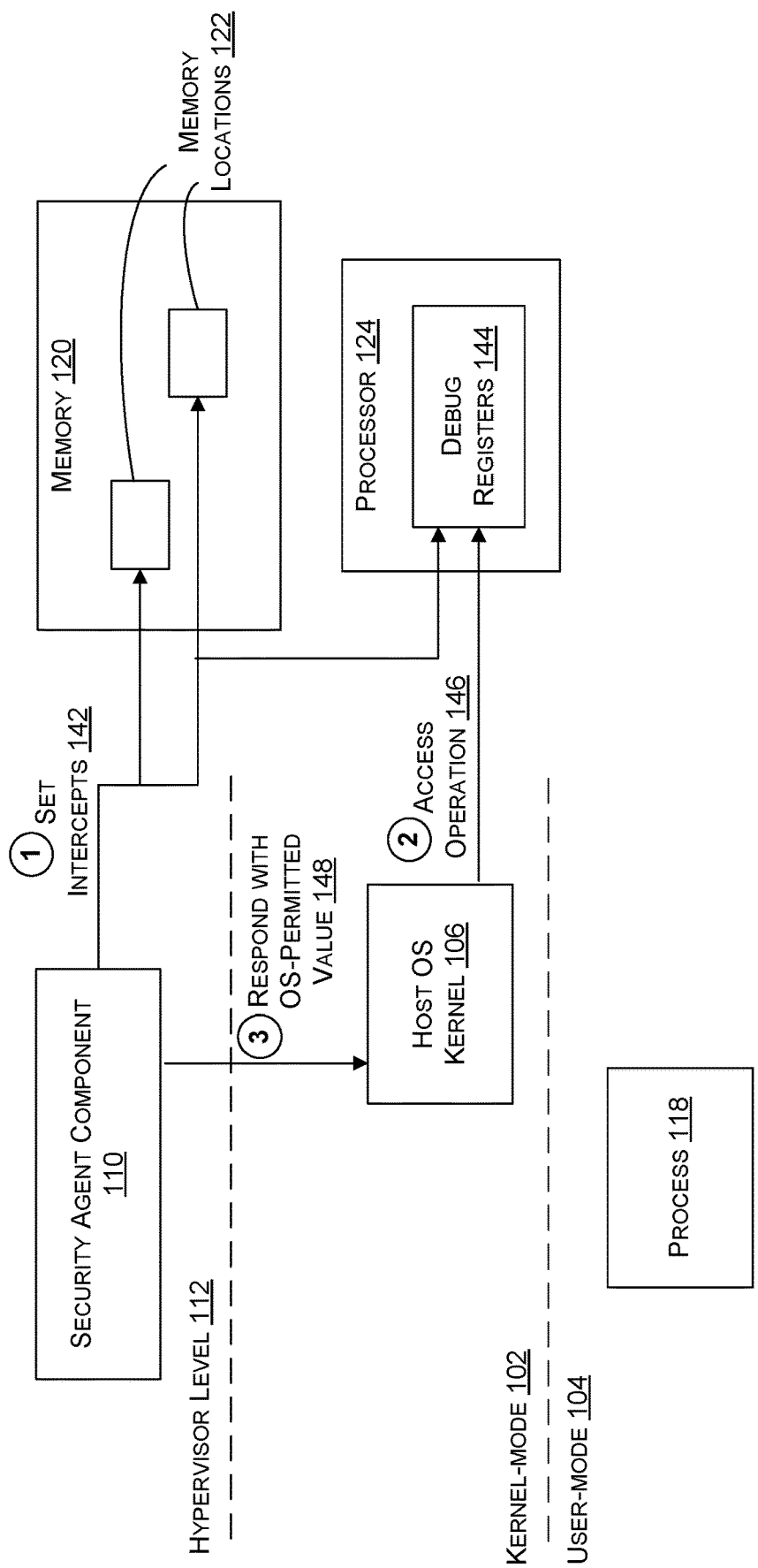

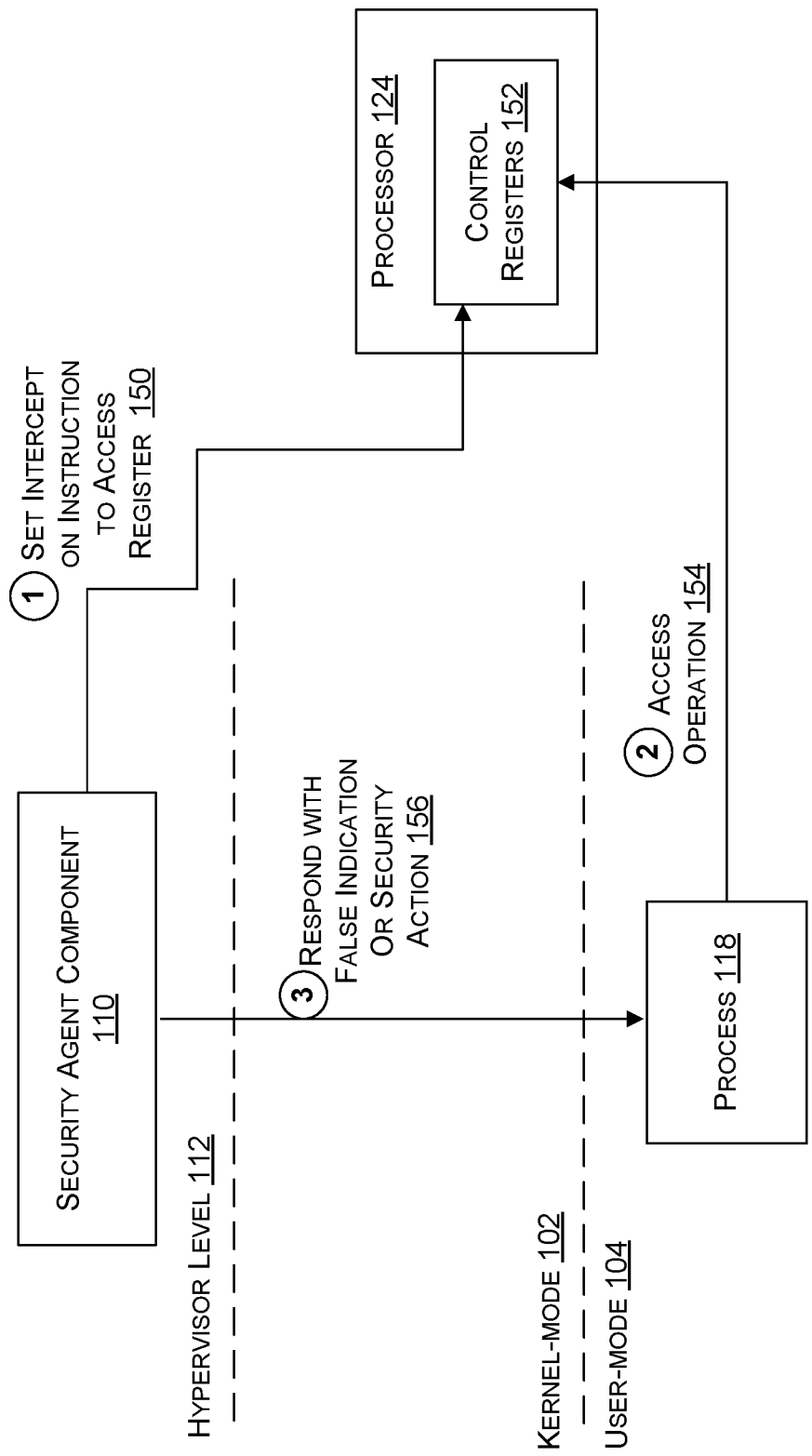

HYPERVISOR-BASED INTERCEPTION OF MEMORY AND REGISTER ACCESSES

RELATED APPLICATIONS

This patent application is a continuation-in-part of U.S. Non-Provisional patent application Ser. No. 15/063,086, filed on Mar. 7, 2016. application Ser. No. 15/063,086 is hereby incorporated by reference, in its entirety.

BACKGROUND

With Internet use forming an ever greater part of day to day life, security exploits that steal or destroy system resources, data, and private information are an increasing problem. Governments and businesses devote significant resources to preventing intrusions and thefts related to these security exploits. Security exploits come in many forms, such as computer viruses, worms, trojan horses, spyware, keystroke loggers, adware, and rootkits. These exploits are delivered in or through a number of mechanisms, such as spearfish emails, clickable links, documents, executables, or archives. Some of the threats posed by security exploits are of such significance that they are described as cyber terrorism or industrial espionage.

While many activities of security exploits can be introspected using hooks or other interception techniques, certain operations cannot be hooked or intercepted in kernel-mode or user-mode. Such operations include memory accesses and individual instruction execution by the processor. Current techniques involve running guest operating systems (OSes) and applications of those guest OSes in virtual machines or running each application in a separate virtual machine. Each of these techniques involves significant overhead, and neither technique is capable of intercepting memory accesses or instructions executing on the host OS itself.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 1a-1d illustrates an overview of a security agent configured to initiate execution of a security agent component as a hypervisor of computing device, the security agent component setting intercepts on memory locations and processor registers of the computing device.

DETAILED DESCRIPTION

Figure 1A:
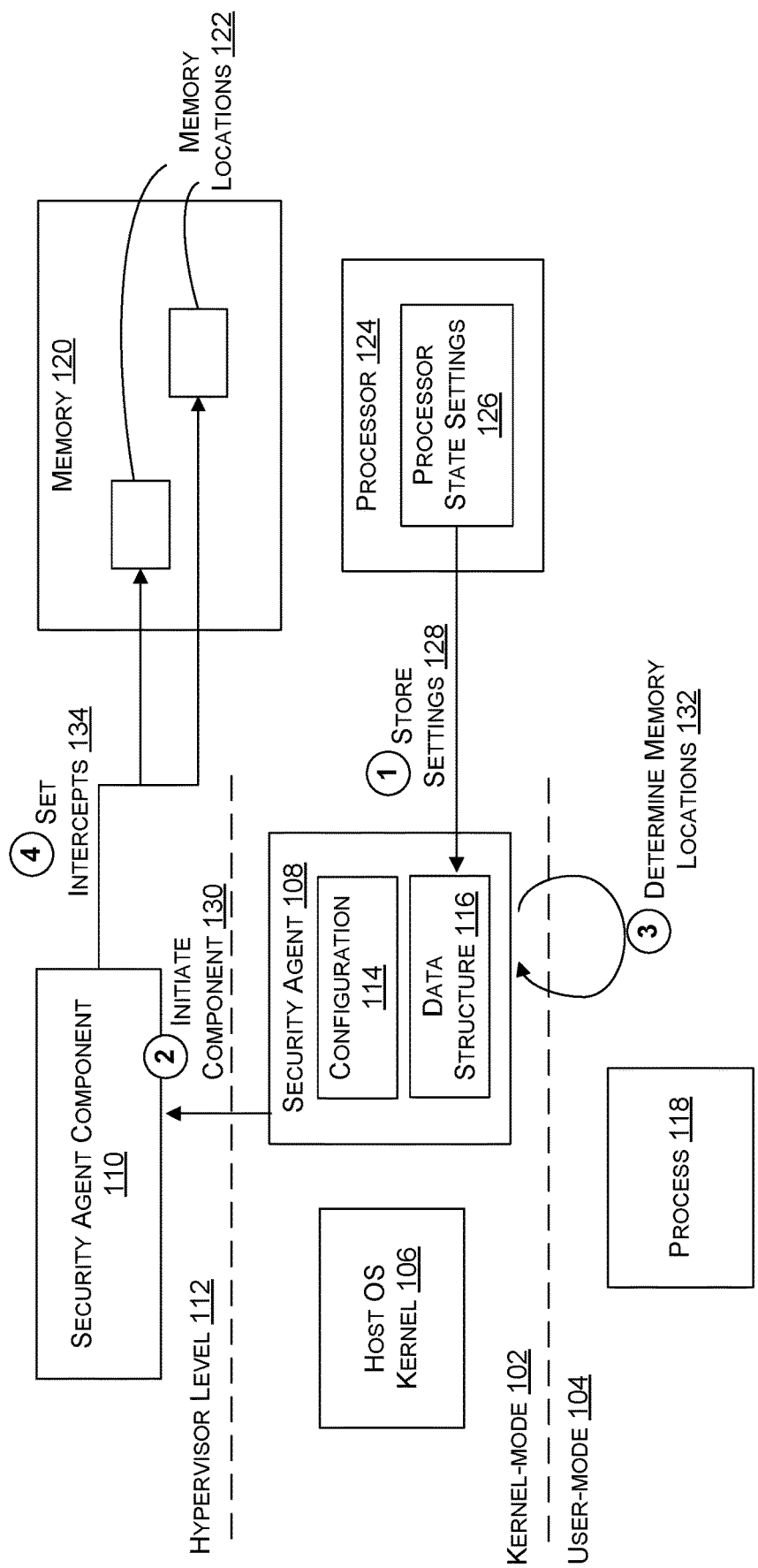

This disclosure describes, in part, security agent configured to initiate a security agent component as a hypervisor for a computing device. Such initiation may involve, in some implementations, storing processor state information into a data structure and instructing the processor to initiate the security agent component as the hypervisor based on the data structure. The security agent may then determine a subset of memory locations in memory of the computing device to be intercepted or one or more processor registers to be intercepted. Such a determination may be based, for example, on a security agent configuration received from a security service. The security agent component may then set intercepts for the determined memory locations or registers. Setting such intercepts may include setting privilege attributes for pages which include the determined memory locations so as to prevent specific operations in association with those memory locations or setting intercepts for instructions affecting the registers.

In some implementations, after setting privilege attributes for pages, operations affecting memory locations in those pages may be noted. In response to one of the specific operations affecting the determined memory location associated with a page, the security agent component may return a false indication of success or allow the operation to enable monitoring of the actor associated with the operation. When an operation affects another memory location associated with that page, the security agent component may temporarily reset the privilege attribute for that page to allow the operation.

In one example, a memory location may store privileged information, and the specific operation protected against may involve writing to that memory location to modify the privileged information. Such an action is known as privilege escalation. To protect against privilege escalation, the privilege attribute of the page including the memory location storing the privileged information may be set to a read only value.

In another example, a memory location may store user credentials, and the specific operation protected against may involve reading the user credentials from the memory location. To protect against such credential reads, the privilege attribute of the page including the memory location storing the user credentials may be set to an inaccessible value. In some implementations, the physical memory location of the page may be modified by the security agent, resulting in the credential read to return data located in a different memory location. The returned user credentials would therefore be invalid as to purposefully mislead an attacker.

In a further example, a memory location may store executable code, and the specific operation protected against may involve executing the code stored at the memory location. To protect against this, the privilege attribute of the page including the memory location storing the executable code may be set to non-executable. The security agent component may then take a further action, such as returning a false indication of successful execution of the code, or redirecting to other code at another location to mislead the attacker.

In various implementations, the security agent component consults a whitelist or component, such as a virtual address space manager, to determine whether any memory locations identified by the security agent are whitelisted. The security agent component may then exclude memory pages that include the whitelisted memory locations from a set of memory pages and set intercepts of memory locations included in the remaining memory pages of the set of memory pages. In some implementations, rather than whitelisting in advance, the security agent component may consult a whitelist when intercepting a memory location to determine whether to allow an operation. Use of whitelisting memory locations may prevent the security agent and security agent component from blocking operations of permitted components known to be associated with those whitelisted memory locations.

In further implementations, the security agent may store memory addresses in debug registers of the processor of the computing device, and the security agent component may set intercepts for the debug registers. Setting the intercepts may include, for example, setting intercepts for instructions seeking to access the debug registers (e.g., reading the debug registers). In some implementations, one of the debug registers may store a memory address not permitted by the operating system of the computing device to be stored in the debug register. For instance, the operating system may prevent memory addresses associated with kernel-level components from being stored in the debug registers. In order to enable storing such a non-permitted memory address in a debug register, the security agent component may respond to a read operation from the operating system seeking to read that debug register with a false, operating-system-permitted value. In addition to setting intercepts for debug registers storing memory addresses, the security agent component may also set intercepts for the memory addresses themselves, e.g., by setting privilege attributes for memory pages that include the memory addresses.

In some implementations, the security agent component may set intercepts for control registers of the processor of the computing device. Setting the intercepts may include setting intercepts for instructions seeking to access the control registers (e.g., seeking to write to the control registers). In various implementations, one of the control registers may store an on setting for a security feature of the computing device. The security agent component may set intercepts on instructions seeking to write to that register to, for instance, turn off the security feature. In response to intercepting such an instruction, the security agent component may respond with a false indication of success, may block the operation, and/or may remember the operation for further analysis.

Overview

FIG. 1 a illustrates an overview of a security agent configured to initiate execution of a security agent component as a hypervisor of computing device, the security agent component setting intercepts on a subset of memory locations of the computing device. As illustrated, a computing device includes components implemented at the kernel-level 102 and at the user-level 104. Kernel-level 102 components include a host OS kernel 106 and a security agent 108. The security agent 108 further includes or is associated with a security agent component 110 implemented at a hypervisor-level 112 of the computing device. The security agent 108 may further include a configuration 114 and a data structure 116 for storing copies of processor state settings. Further, user-level 104 components may include a process 118. Additionally, the computing device may have a memory 120 having multiple memory locations 122 and a processor 124 having processor state settings 126. FIG. 1 a further shows, at 128, the security agent 108 storing processor state settings 126 in the data structure 116 and, at 130, initiating the security agent component 110 as a hypervisor based on the data structure 130. The security agent 108 then, at 132, determines memory locations 122 to be intercepted and the security agent component 110 sets, at 134, intercepts for the determined memory locations 122.

Figure 3:
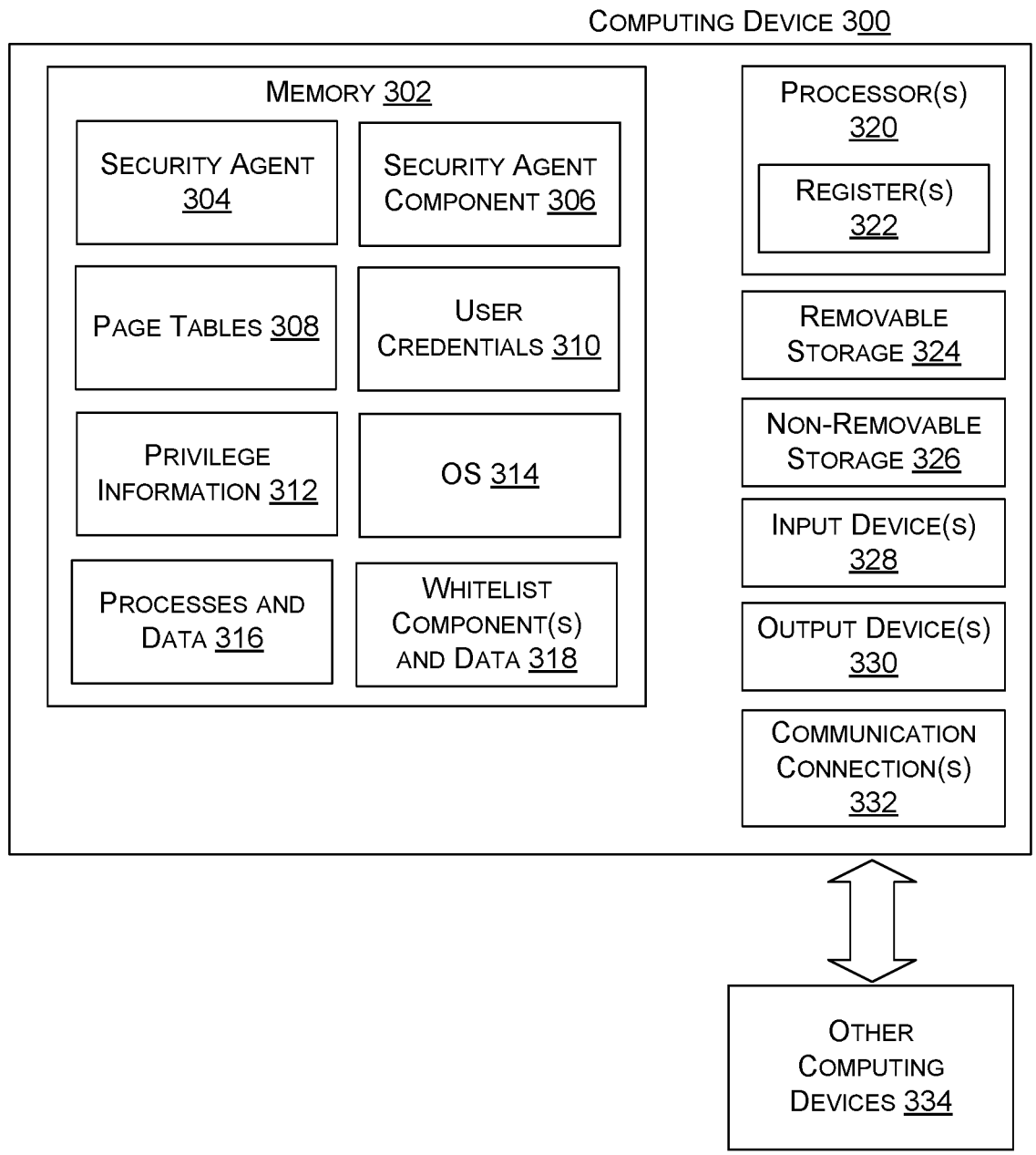
FIG. 3 illustrates a component level view of a computing device configured with a security agent and security agent component configured to execute as a hypervisor.

In various embodiments, a computing device may include the host OS kernel 106, security agent 108, security agent component 110, process 118, memory 120, and processor 124. Such a computing device may be a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices. When implemented on multiple computing devices, the host OS kernel 106, security agent 108, security agent component 110, process 118, memory 120, and processor 124 may be distributed among the multiple computing devices. An example of a computing device including the host OS kernel 106, security agent 108, security agent component 110, process 118, memory 120, and processor 124 is illustrated in FIG. 3 and described below with reference to that figure.

The computing device may implement multiple protection rings or privilege levels which provide different levels of access to system resources. For example, user-level 104 may be at an "outer" ring or level, with the least access (e.g., "ring 3"), kernel-level 102 may be at an "inner" ring or level, with greater access (e.g., "ring 0" or "ring 1"), and hypervisor-level 112 may be an "inner-most" ring or level (e.g., "ring −1" or "ring 0"), with greater access than kernel-level 102. Any component at the hypervisor-level 112 may be a hypervisor which sits "below" (and has greater access than) a host OS kernel 106.

The host OS kernel 106 may be a kernel of any sort of OS, such as a Windows® OS, a Unix OS, or any other sort of OS. Other OSes, referred to as "guest" OSes, may be implemented in virtual machines supported by the host OS. The host OS kernel 106 may provide access to hardware resources of the computing device, such as memory 120 and processor 124 for other processes of the computing device, such as process 118.

The security agent 108 may be a kernel-level security agent, which may monitor and record activity on the computing device, may analyze the activity, and may generate alerts and events and provide those alerts and events to a remote security service. The security agent 108 may be installed by and configurable by the remote security service, receiving, and applying while live, configurations of the security agent 108 and its component(s), such as security agent component 110. The configuration 114 may be an example of such a configuration. An example security agent 108 is described in greater detail in U.S. patent application Ser. No. 13/492,672, entitled "Kernel-Level Security Agent" and filed on Jun. 8, 2012, which issued as U.S. Pat. No. 9,043,903 on May 26, 2015.

The security agent component 110 may be a component of the security agent 108 that is executed at a hypervisor for the computing device at hypervisor-level 112. The security agent component 110 may perform hypervisor functions, such as adjusting privilege attributes (e.g., "read-write," "read only," "inaccessible," etc.) of memory pages and managing system resources, such as memory 120. The security agent component 110 may perform at least some of its functions based on the configuration 114 of the security agent 108, which may include configuration settings for the security agent component 110. The security agent component 110 may also perform hypervisor functions to adjust the physical location of memory pages associated with memory 120.

The configuration 114 may comprise any of settings or system images for the security agent 108 and security agent component 110. As noted above, the configuration 114 may be received from a remote security service and may be applied by the security agent 108 and security agent component 110 without rebooting the computing device.

The data structure 116 may be a structure for storing processor state information. Such as data structure may be, for instance, a virtual machine control structure (VMCS). In some implementations, a subset of the settings in the data structure 116 may be set by the security agent 108 based on the OS. In such implementations, the security agent 108 may have different routines for different OSes, configuring the data structure 116 with different settings based on the OS. Such settings may typically be processor state settings which are invariant for a given OS. Other settings are then obtained from processor state settings 126. In other implementations, the security agent 108 may not have different routines for different OSes and may obtain all settings for the data structure 116 from the processor state settings 126.

In various implementations, the process 118 may be any sort of user-level 104 process of a computing device, such as an application or user-level 104 OS component. The process 118 may perform various operations, including issuing instructions for execution and making read, write, and execute requests of different memory locations. Such read, write, and execute requests may be addressed to virtual addresses, which may be mapped to physical addresses of memory pages by page tables of the OS kernel 106 or to further virtual addresses of extended or nested page tables, which are then mapped to physical addresses. Such processes 118 may include security exploits or be controlled by such exploits though vulnerabilities and may attempt malicious activity, such as privilege escalation or credential theft, through direct accesses of memory locations or indirect accesses utilizing, for example, vulnerabilities of the host OS kernel 106.

Memory 120 may be memory of any sort of memory device. As shown in FIG. 1, memory 120 may include multiple memory locations 122, the number of memory locations 122 varying based on the size of memory 120. The memory locations 122 may be addressed through addresses of memory pages and offsets, with each memory page including one or more memory locations. Privileges associated with memory locations 122, such as reading, writing, and executing may be set on a per-page granularity, with each memory page having a privilege attribute. Thus, memory locations 122 of a same page may have the same privileges associated with them. Examples of memory 120 are illustrated in FIG. 3 and described below in detail with reference to that figure.

The processor 124 may be any sort of processor, such as a central processing unit (CPU), a graphics processing unit (GPU), or both CPU and GPU, or other processing unit or component known in the art. The processor 124 may be associated with a data structure describing its state, the contents of which are referred to herein as the processor state settings 126. As described above, in some implementations, a subset of the processor state settings 126 may be invariant for a type of OS. Additionally, the processor 124 supports hardware-based virtualization (such as Intel™ VT-x) with second level address translation (SLAT).

In various implementations, the security agent 108 is configured to initiate execution of the security agent component 110 as a hypervisor. Such initiating may be performed without any rebooting of the computing device. As shown in FIG. 1, this initiating may involve, at 128, storing the processor state settings 126 in the data structure 116. If any of the processor state settings 126 are invariant, they may have already been included in the data structure 116 by the security agent 108 and thus do not need to be stored again. The initiating may then include, at 130, initiating the security agent component 110 based on the data structure 116. This may involve providing a reference to the security agent component 110 and the data structure 116 along with a "run" instruction.

Next, the security agent 108 determines, at 132, any memory locations 122 or instructions to be intercepted. The security agent 108 may utilize the configuration 114 provided by the security service to determine the memory locations 122 and instructions. Such memory locations 122 may include locations storing executable code or privilege information (e.g., indications of admin privileges) for a process or user credentials (e.g., passwords). As mentioned above, updates to the configuration 114 may be received and applied without rebooting. Upon receiving an update to the configuration 114, the security agent may repeat the determining at 132.

To free memory space, computing devices often clear memory mappings for memory pages which have not been recently accessed and write out their contents to disk, referred to as a page-out operation. When memory is accessed again, the contents are brought back from disk, referred to as a page-in operation. To ensure, then, that knowledge of memory locations 122 stays up-to-date, the security agent 108 may request that the OS kernel 106 lock page tables of mappings in page tables to memory pages which include the memory locations 122 that are to be intercepted. Alternatively, the security agent component 110 may intercept page out requests and prevent paging out of memory pages which include the memory locations 122 that are to be intercepted, or it may intercept page in requests in order to update its knowledge of memory locations 122 and repeat determining at 132.

In various implementations, the security agent component 110 then, at 134, sets intercepts for the instructions and memory locations 122 determined by the security agent 108. In some implementations, setting intercepts may involve determining the memory pages which include the determined memory locations 122 and setting privilege attributes for those pages. The privilege attribute chosen—e.g., "non-executable" or "read only" or "inaccessible"—may be a function of the memory accesses that the security agent 108 and security agent component 110 are configured to intercept. When a process 118 seeks to perform such a memory access—e.g., to execute code stored at a memory page marked "non-executable"—the security agent component 110 will receive notification.

In other implementations, setting intercepts may involve changing the physical memory location of the determined memory locations 122 to reference misleading, incorrect, or otherwise unusable data or code. When a process 118 seeks to perform such memory access—e.g., to read a memory page containing data at memory location 122, the data will instead by read from an alternate memory location.

In some implementations, upon termination of a process 118, the security agent component 110 may remove intercepts for memory locations 122 associated with the process 118. This may involve resetting privilege attributes for the memory pages including the memory locations 122 to their previous settings, or it may include resetting the physical memory location for the memory pages.

Figure 1B:
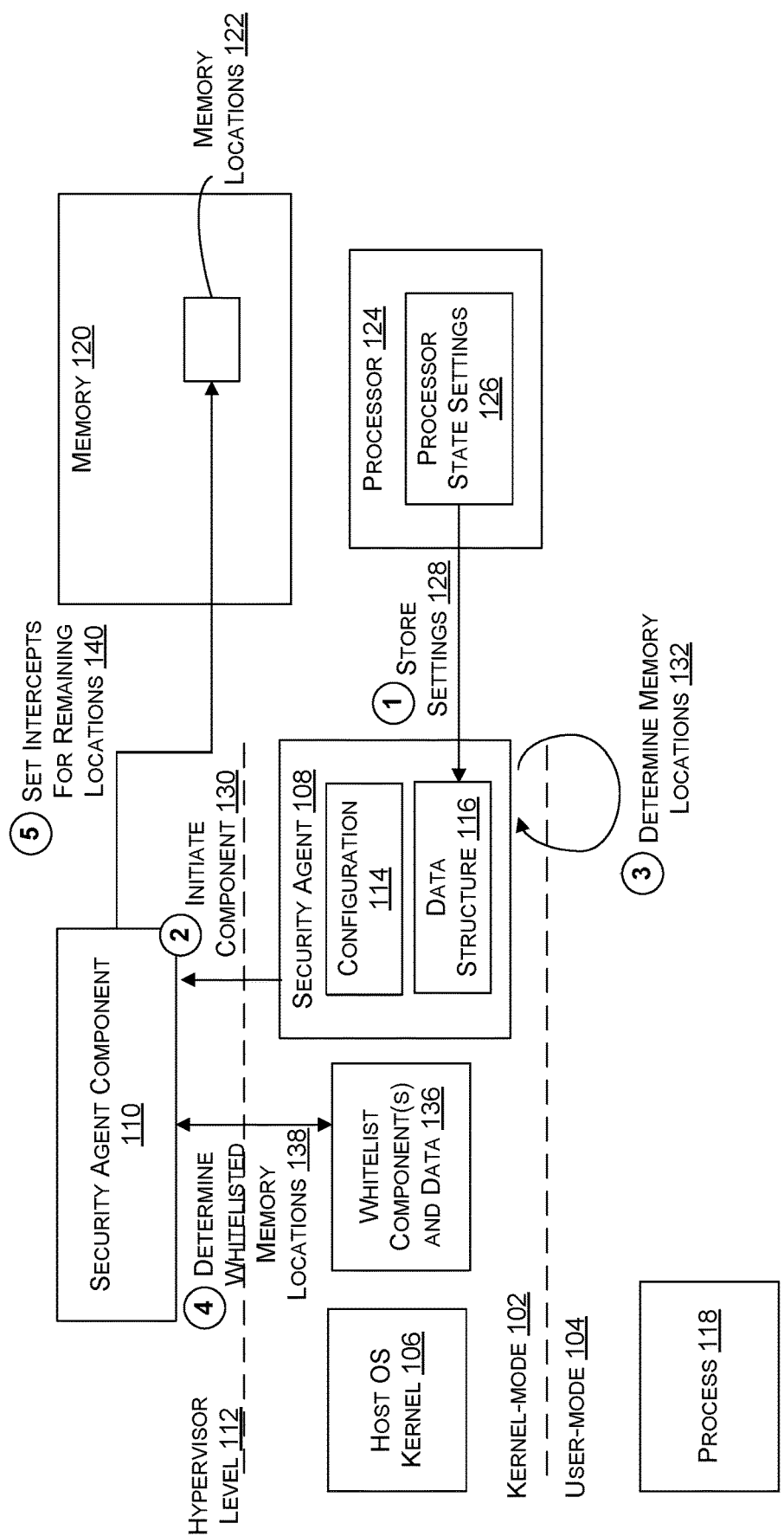

FIG. 1b illustrates an overview of a security agent and security agent component configured to determine whitelisted memory locations and to exclude memory pages that include those whitelisted memory locations from a set of memory pages including other, intercepted memory locations. As illustrated, the security agent component 110 may utilize whitelist component(s) and data 136, at 138, to determine whitelisted memory locations. The security agent component 110 then excludes memory pages having the whitelisted memory locations and, at 140, sets intercepts for the remaining memory locations that are not associated with the excluded memory pages. In other implementations, whitelisting may occur entirely or partly after the setting of intercepts, at the time of interception. In such implementations, the security agent component 110 may consult the whitelist for all or some part of the intercepted memory locations to determine whether the operation should be allowed. Whitelisting at the time of interception, rather than in advance (or in addition to advance whitelisting) allows the security service associated with the security agent component 110 to apply a more up-to-date whitelist.

In various implementations, the whitelist component(s) and data 136 may include a data structure, such as a list, received from a remote security service (e.g., as part of the security agent 108 configuration), an executable component, or both. For example, the whitelist component(s) and data 136 may comprise an executable component, such as a virtual address space manager, which categorizes address spaces of memory 120 into different regions, such as page tables, hyperspace, session-space, loader mappings, system-cache, PFN database, non-paged pool, paged pool, system PTEs, HAL heap, etc. These regions may be received in a specification from a remote security service or may be identified by the virtual address space manager based on their size and alignment specifications. Look-up tables, shadow page tables, or both, may be used to lookup the regions and identify which region a memory location 122 corresponds to, if any. Also, one of these regions, or a portion of a region, may be associated with a parameter whitelisting that region or portion of a region. In one implementation, the security agent component 110 may build or extend the whitelist component(s) and data 136 or memory regions based on memory access pattern(s) of known safe component(s).

In some implementations, one or more components of the computing device may be identified as known safe components. Such known safe components may, for instance, behave in a manner similar to a malicious process or thread, making it difficult to distinguish between the known safe component and malicious process strictly by behavior. If the known safe component is identified in advance, e.g., by the configuration 114 of the security agent 108, along with memory locations or memory regions associated with that known safe component, those memory locations or memory regions may be whitelisted, either by a component such as a virtual address space manager or in a list received from a remote security service.

As described above with respect to FIG. 1a, the security agent 108 may initiate the security agent component 110 as hypervisor and, at 132, identify memory locations 122 to be intercepted. In various implementations, once the memory locations 122 have been identified, the security agent component 110 may determine a set of memory pages that include the identified memory locations 122 and determine, at 138, any whitelisted memory locations. The determining of a set of memory pages is described above. To determine, at 138, the whitelisted memory locations, the security agent component 110 consults the whitelist component(s) and data 136. The security agent component 110 may, in some implementations, determine the set of memory pages for the identified memory locations 122 first and then determine whether any of those memory pages are associated with a whitelisted memory location or whitelisted memory region. Those whitelisted memory pages are then excluded by the security agent 110 from the set of memory pages. Alternatively, the security agent component 110 may compare the identified memory locations 122 to the whitelisted memory locations or whitelisted memory regions and then determine memory pages for any of the identified memory locations 122 that are not whitelisted. This set of memory pages with whitelisted memory locations not included is referred to herein as the set of remaining memory pages.

At 140, the security agent component 110 sets intercepts for the set of remaining memory pages. As described above, this may include setting privilege attributes for the memory pages included in the set of remaining memory pages.

Alternatively, or additionally, the security agent component 110 may, at the time of interception, determine whether a memory location is whitelisted. This comparison may be performed in addition to the whitelist comparison and exclusion described above, or in place of it, with all memory pages effectively included in the set of remaining memory pages.

FIG. 1c illustrates an overview of a security agent and security agent component configured to intercept debug registers and provide an operating-system-permitted result responsive to access by the operating system of the debug registers. As illustrated, at 142, the security agent component 110 may set intercepts for debug registers 144 and, at 146, note an access operation, such as a read operation, from the operating system (e.g., from the host OS kernel 106). At 148, the security agent component 110 then responds to the operating system's access operation with an operating-system-permitted value.

Debug register(s) 144 may be registers used by processor 124 for program debugging, among other possible uses. Processor 124 may be an x86 series processor and include, for example, six debug registers, two of which may be used for control and status. Each debug register 144 may store a memory address and may be associated with a condition that triggers a notification—e.g., reading to the memory address, writing from the memory address, executing code stored at the memory address.

In some implementations, the operating system of the computing device may prohibit the storing of memory addresses associated with kernel-mode code or data from being stored in a debug register 144. The operating system may query the debug register(s) 144 on some basis (e.g., periodic) to determine whether the debug register(s) 144 store non-permitted memory addresses.

In various implementations, the security agent 108 may store memory addresses in some or all of the available debug register(s) 144. The memory addresses stored in the debug register(s) 144 may be specified by the configuration 114 of the security agent 108.

In further implementations, at 142, the security agent component 110 (initiated by the security agent 108, as described above) then sets intercepts for the debug register(s) 144. Setting intercepts for the debug register(s) 144 may include setting intercepts for instructions for accessing the debug register(s) 144.

At 146, the security agent component 110 then notes an access operation, such as a read operation, from the operating system seeking to determine whether a debug register 144 stores an operating-system-permitted value. At 148, the security agent component 110 then responds to the operating system with an operating-system-permitted value. If the debug register 144 being read is storing a memory address not permitted by the operating system, the security agent component 110 may respond with a false, operating-system-permitted value.

In some implementations, when a process 118 attempts some access with respect to a memory address stored in a debug register 144 (e.g., reading, writing, executing, etc.), the security agent 108 is informed of the access and may respond in a manner specified by its configuration 114 (e.g., take some security action such as monitoring or killing the process 118, respond with a false indication of success, etc.).

In various implementations, the security agent 108 may also identify one or more of the memory addresses stored by the debug register(s) 144 as memory locations to be intercepted. The security agent component 110 then sets intercepts for those memory addresses by, e.g., determining the memory pages that include the memory addresses and setting privilege attributes for those memory pages. In this way, two methods may be used by the security agent 108 and security agent component 110 to detect operations associated with a memory address.

In further implementations, in addition to use of debug registers and page privilege attributes for certain memory addresses, the security agent 108 may identify other memory locations, and the security agent component 110 may set intercepts (e.g., page privilege attributes) for those other memory locations, as described above with respect to FIG. 1*a*.

FIG. 1*d* illustrates an overview of a security agent and security agent component configured to intercept control register(s) and respond to a write operation directed at one of the control registers with a false indication of success. As illustrated, at 150, the security agent component 110 sets intercepts on instructions for accessing control register(s) 152. The security agent component 110 then notes an access operation, at 154, and responds, at 156, with a false indication of success and/or with a security action.

Control registers 152 may be registers of the processor 124 which change or control the behavior of the processor 124 or another device. x86 series processors may include control registers such as CR0, CR2, CR3, and CR4, and x86-64 series processors may also include EFER and CR8 control registers. Such control registers may each have a specific or general purpose, and control registers 152 may include any, all, or none of these x86 series processor control registers.

In some implementations, at least one of the control registers 152 may include an on setting for a security feature of the computing device. For example, control registers 152 may include a CR4 register that stores an on setting for a security feature called Supervisor Mode Execution Prevention (SMEP). SMEP may prevent the processor 124 from executing code in a user mode memory range while the privilege of the processor 124 is still in kernel mode, essentially preventing kernel mode privilege escalation. If process 118 is a malicious process or thread operating in kernel mode, however, it is able to turn off SMEP, as any kernel mode process or thread can set the on setting in CR4 to an off value.

In further implementations, the security agent 108 may determine which of the control register(s) 152 to protect. For example, the configuration 114 of the security agent 108 may specify that the CR4 register of control register(s) 152 should be protected. At 150, then, the security agent component 110 (initiated by the security agent 108, as described above) may set intercepts for the control register(s) 152 that are to be protected. Setting intercepts for those control register(s) 152 may include, at 150, setting intercepts for instructions seeking to access those control register(s) 152.

In some implementations, at 154, the security agent component 110 then notes an instruction seeking to access one of the control register(s) 152, such as a write operation seeking to write an off value to a CR4 register to turn off a security feature. The security agent component 110 then responds, at 156, with a false indication of success or by initiating a security action (e.g., killing the process 118 that requested the write operation or monitoring that process 118).

Figure 2A:
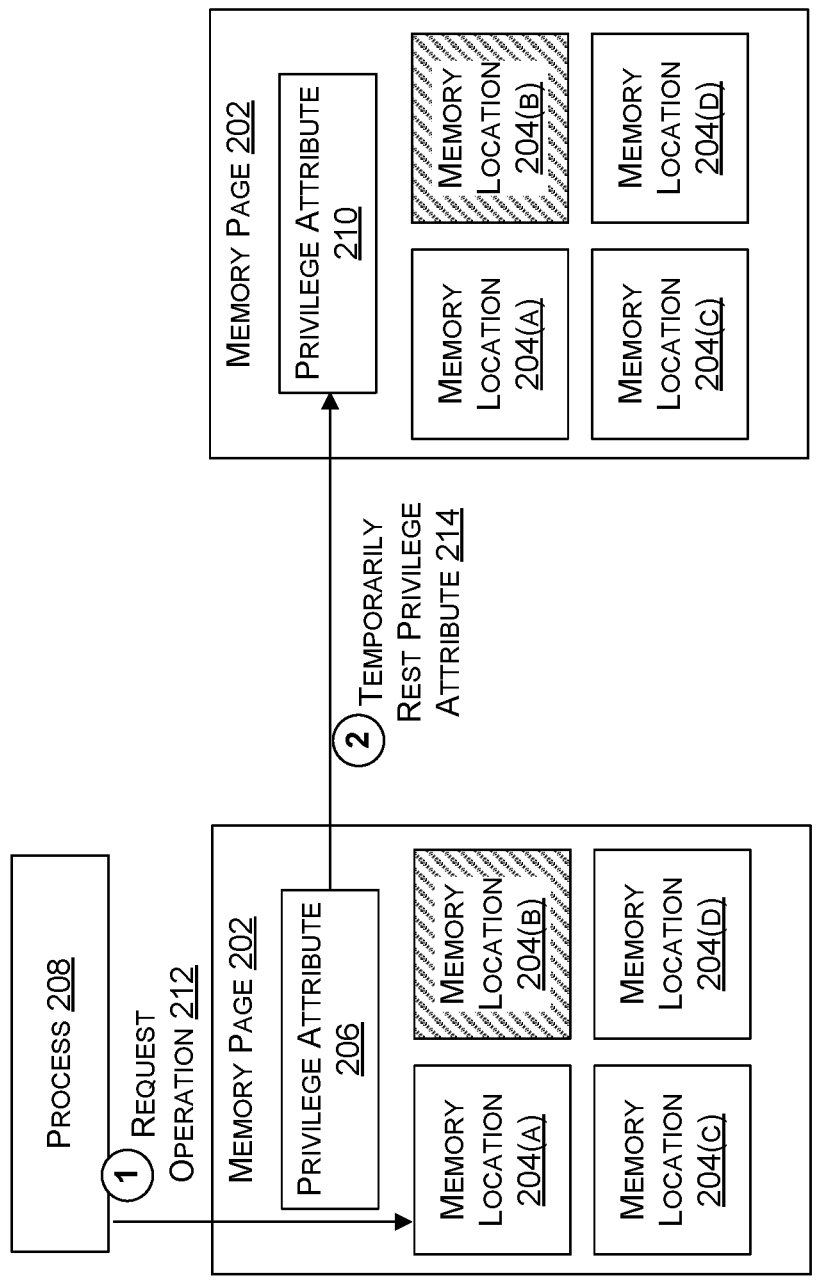
FIGS. 2a-2b illustrate overviews of techniques for protecting memory locations through privilege attributes of pages while enabling operations on other memory locations associated with those pages.
Figure 2B:
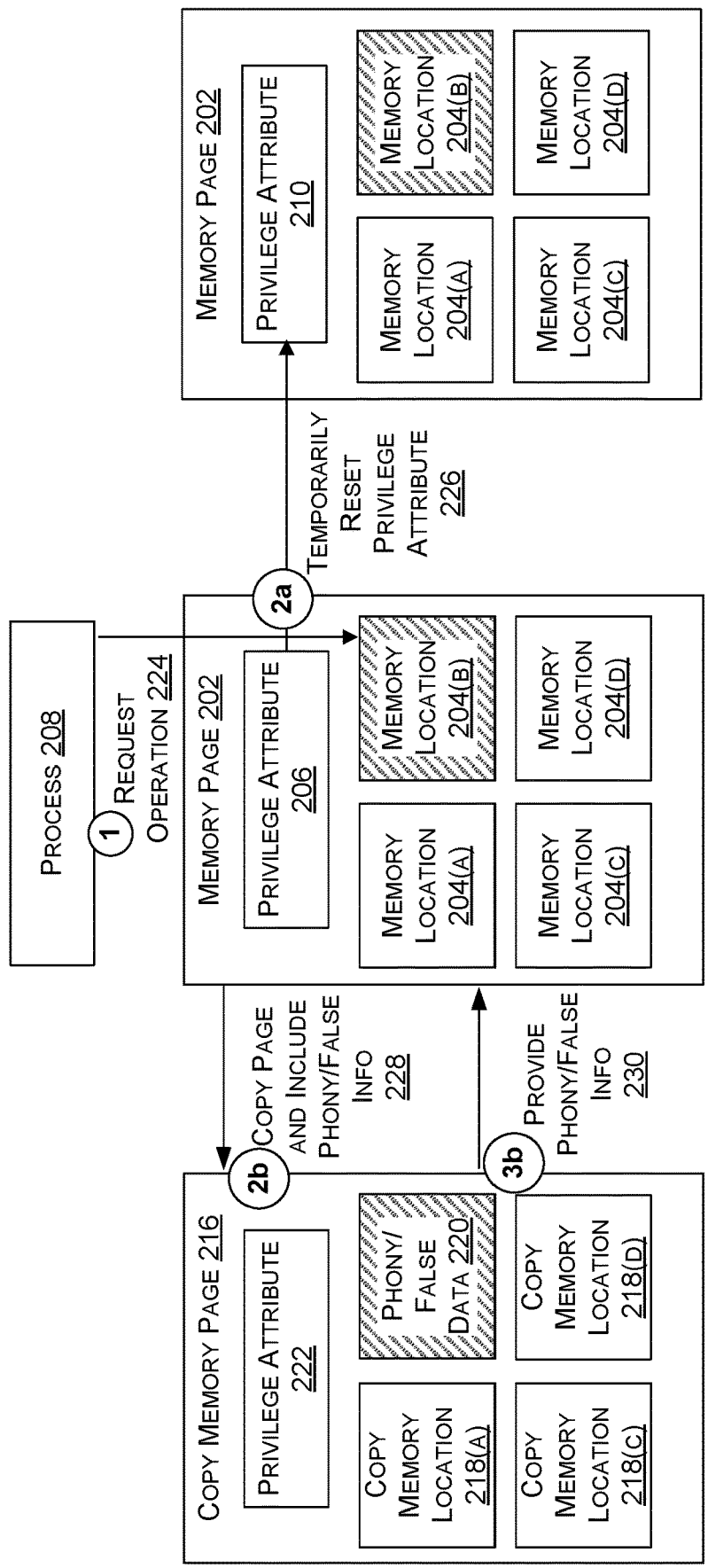

FIGS. 2*a*-2*b* illustrate overviews of techniques for protecting memory locations through privilege attributes of pages while enabling operations on other memory locations associated with those pages. FIG. 2*a* includes a memory page 202 having at least memory location 204(*a*), memory location 204(*b*), memory location 204(*c*), and memory location 204(*d*), as well as privilege attribute 206. Further, a process 208, as shown, may make requests associated with the memory locations 204. Also, as shown in FIG. 2*a*, that privilege attribute 206 may be temporarily reset to privilege attribute 210. A process 208 may, at 212, request an operation not permitted by privilege attribute 206. Because the operation may be directed to memory location 204(*a*), which is not one of the memory locations determined by the security agent 108, the security agent component 110 may, at 214, temporarily reset the privilege attribute 206 to privilege attribute 210 to allow the operation to proceed.

In various implementations, memory page 202 may be an example of the memory pages discussed above with reference to memory 120, memory locations 204 may be examples of memory locations 122, and privilege attributes 206 and 210 may be examples of the privilege attributes discussed above with reference to memory 120. Further, process 208 may be an example of process 118.

Process 208 may request, at 212, an operation such as a read from or write to a memory location 204, or an execute operation to execute code stored at memory location 204. Upon noting the request, the security agent component 110 may determine the memory page 202 associated with the request as well as the specific memory location 204 on that memory page 202. The security agent component 110 then determines if the memory location is one of the memory locations identified by the security agent 108. In FIG. 2*a*, the memory location 204 identified by the security agent 108 is memory location 204(*b*), and the operation is a request associated with memory location 204(*a*). In such an example, if the operation does not conflict with the privilege attribute 206, the operation is allowed to proceed. If, on the other hand, the operation is not permitted by the privilege attribute, then the security agent component 110 may, at 212, temporarily reset the privilege attribute 206 to privilege attribute 210 to allow the operation to proceed. For example, if privilege attribute 206 is "inaccessible" (e.g., to prevent reads of user credentials stored at memory location 204(*b*)), the security agent component 110 may temporarily reset the privilege attribute 206 to be privilege attribute 210, which may be "read only." Or in another example, if the privilege attribute 206 is "non-executable" (e.g., to prevent execution of code stored at memory location 204(*b*)), the security agent component 110 may temporarily reset the privilege attribute 206 to be privilege attribute 210, which may be "executable." After the operation has been processed, the security agent component 110 may return the privilege attribute 210 to be privilege attribute 206.

FIG. 2*b* includes a memory page 202 having at least memory location 204(*a*), memory location 204(*b*), memory location 204(*c*), and memory location 204(*d*), as well as privilege attribute 206. A process 208, as shown, may make requests associated with the memory locations 204, and privilege attribute 206 may be temporarily reset to privilege attribute 210. As is further illustrated, copies of information stored in memory page 202 may be stored in a copy memory page 216. The copy memory page 216 may include copy memory location 218(*a*), which includes a copy of the information stored at memory location 204(*a*); copy memory location 218(*c*), which includes a copy of the information stored at memory location 204(*c*); and copy memory location 218(*d*), which includes a copy of the information stored at memory location 204(*d*). Rather than storing a copy of the information from memory location 204(*b*), the copy memory page 216 may include phony/false or deceptive data or code 220. The copy memory page 216 may also include a privilege attribute 222, which may represent elevated privileges when compared to privilege attribute 206.

As illustrated, the process 208 may, at 224, request an operation affecting memory location 204(*b*). Because 204(*b*) is one of the memory locations identified by the security agent 108, the security agent component 110 may respond in one of a number of ways. At 226, the security agent component 110 may temporarily reset the privilege attribute 206 to be privilege attribute 210 in order to allow the operation to proceed. The security agent component 110 may then also identify the process, thread, or component that made the request for the operation at 224 and may monitor further activity of that process, thread, or component or terminate that process, thread, or component. Alternatively, the security agent component 110 may, at 228 generate copy memory page 216, including the phony/false or deceptive data or code 220, and may, at 230, allow the process 208 to access the phony/false or deceptive data or code 220.

Process 208 may request, at 224, an operation such as a read from or write to a memory location 204 or an execute operation to execute code stored at a memory location 204. Upon noting the request, the security agent component 110 may determine the memory page 202 associated with the request as well as the specific memory location 204 on that memory page 202. The security agent component 110 then determines whether the memory location is one of the memory locations identified by the security agent 108. In FIG. 2*b*, the memory location 204 identified by the security agent 108 is memory location 204(*b*), and the operation is a request associated with memory location 204(*b*). Accordingly, the security agent component 110 determines that the memory location 204(*b*) is one of the memory locations identified by the security agent 108. In response, the security agent component 110 may take no action, which may result in the computing device crashing and rebooting. Alternatively, the security agent component may take action to allow the operation and monitor further operation, allow the operation to occur on phony/false or deceptive data or code 220, or to provide a false indication of success to the process 208.

In a first example, the operation request at 224 may be a write operation to modify privilege information stored at memory location 204(*b*). In response to the request for the write operation, the security agent component 110 may allow the operation to proceed by temporarily resetting, at 226, the privilege attribute 206 to be privilege attribute 210. The security agent component 110 may also identify the process, thread, or component that made the request for the write operation (i.e., process 208) and may monitor further activity of that process, thread, or component. Alternatively, the security agent component 110 may copy, at 228, the contents of memory page 202 to copy memory page 216, set the privilege attribute 222 to read-write, and temporarily redirect from memory page 202 to copy memory page 216. The security agent component 110 may then allow the write operation to proceed, and the process 208 may modify the copy memory page 216 and receive an indication of success. The security agent component 110 may then return mapping to point to memory page 202. Thus, the memory location 204(*b*) is protected, the process 208 is tricked into thinking it succeeded, and both objectives are achieved without the computing device crashing.

In a second example, the operation request at 224 may be a read operation to obtain user credentials stored at memory location 204(*b*). In response to the request for the read operation, the security agent component 110 may allow the operation to proceed by temporarily resetting, at 226, the privilege attribute 206 to be privilege attribute 210. The security agent component 110 may also identify the process, thread, or component that made the request for the read operation (i.e., process 208) and may monitor further activity of that process, thread, or component. Alternatively, the security agent component 110 may copy, at 228, the contents of memory page 202 to copy memory page 216, set the privilege attribute 222 to read only, and temporarily redirect from memory page 202 to copy memory page 216. In addition to copying the contents of memory page 202, the security agent component 110 may store phony/false or deceptive data 220 at the same offset in copy memory page 216 as the memory location 204(*b*) is in memory page 202. The security agent component 110 then allows the read operation to proceed, and the process 208 read the phony/false or deceptive data 220. After the read operation, the security agent component 110 may then return mapping to point to memory page 202. If the process 208 obtained deceptive data 220, such as a username and password for a monitored account, then future use of that username and password may trigger monitoring by the security agent 108 and/or the security agent component 110.

In a third example, the operation request at 224 may be an execute operation to execute code stored at memory location 204(*b*). In response to the request for the execute operation, the security agent component 110 may allow the operation to proceed by temporarily resetting, at 226, the privilege attribute 206 to be privilege attribute 210. The security agent component 110 may also identify the process, thread, or component that made the request for the execute operation (i.e., process 208) and may monitor further activity of that process, thread, or component.

Alternatively, the security agent component 110 may copy, at 228, the contents of memory page 202 to copy memory page 216, set the privilege attribute 222 to execute, and temporarily redirect from memory page 202 to copy memory page 216. The security agent component 110 may then allow the execute operation to proceed, and the process 208 may execute false code stored at copy memory page 216 and receive an indication of success. The security agent component 110 may then return mapping to point to memory page 202. Thus, the memory location 204(*b*) is protected, the process 208 is tricked into thinking it succeeded, and both objectives are achieved without the computing device crashing.

In a further alternative, rather than allowing and monitoring or redirecting, the security agent component 110 may prohibit the execute action and/or kill the process that requested the execute operation (or a process deemed by the security service to be responsible for that execute operation).

Example System

FIG. 3 illustrates a component level view of a computing device configured with a security agent and security agent component configured to execute as a hypervisor. As illustrated, computing device 300 comprises a memory 302 storing a security agent 304, a security agent component 306, page tables 308, user credentials 310, privilege information 312, an OS 314, processes and data 316, and whitelist component(s) and data 318. Also, computing device 300 includes processor(s) 320 with register(s) 322, a removable storage 324 and non-removable storage 326, input device(s) 328, output device(s) 330 and communication connections 332 for communicating with other computing devices 334.

In various embodiments, memory 302 is volatile (such as RAM), non-volatile (such as ROM, flash memory, etc.) or some combination of the two. Memory 302 may be an example of memory 120, which is described above in detail with respect to FIG. 1. The security agent 304 may be an example of security agent 108, which is described above in detail with respect to FIG. 1. The security agent component 306 may be an example of security agent component 110, which is described above in detail with respect to FIG. 1. Page tables 308 may be any sort of page tables, such as page tables mapping virtual addresses to physical addresses of memory pages. Uses of such page tables 308 are described above in detail with respect to FIG. 1 and FIGS. 2*a*-2*b*. User credentials 310 may be any sort of user credentials, such as user names and passwords for one or more processes or components. Privilege information 312 may be indications of privileges, such as admin privileges for processes, threads, user accounts, etc. The OS 314 may be any sort of OS, such as the host OS kernel 106 described above in detail with respect to FIG. 1. The processes and data 316 may be any sort of processes and data, such as process 118, which is described above in detail with respect to FIG. 1, or process 208, which is described above in detail with respect to FIGS. 2*a*-2*b*. The whitelist component(s) and data 318 may be any sort of components and data, such as whitelist component(s) and data 136, which is described above in detail with respect to FIG. 1*b*.

In some embodiments, the processor(s) 320 is a central processing unit (CPU), a graphics processing unit (GPU), or both CPU and GPU, or other processing unit or component known in the art. Processor 320 supports hardware-based virtualization (such as Intel™ VT-x) with second level address translation (SLAT). Processor(s) 320 may be an example of processor 124, which is described above in detail with respect to FIGS. 1*a*-1*d*. Also, processor 320 may include one or more processor register(s) 322. Processor register(s) 322 may be example(s) of either or both of the debug registers 144, which are described above in detail with respect to FIG. 1*c*, or the control registers 152, which are described above in detail with respect to FIG. 1*d*.

Computing device 300 also includes additional data storage devices (removable and/or non-removable) such as, for example, magnetic disks, optical disks, or tape. Such additional storage is illustrated in FIG. 3 by removable storage 324 and non-removable storage 326. Non-transitory computer-readable media may include volatile and nonvolatile, removable and non-removable tangible, physical media implemented in technology for storage of information, such as computer readable instructions, data structures, program modules, or other data. System memory 302, removable storage 324 and non-removable storage 326 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the computing device 300. Any such non-transitory computer-readable media may be part of the computing device 300.

Computing device 300 also has input device(s) 328, such as a keyboard, a mouse, a touch-sensitive display, voice input device, etc., and output device(s) 330 such as a display, speakers, a printer, etc. These devices are well known in the art and need not be discussed at length here.

Computing device 300 also contains communication connections 332 that allow the computing device 300 to communicate with other computing devices 334, such as device(s) of a remote security service.

Example Processes

Figure 4:
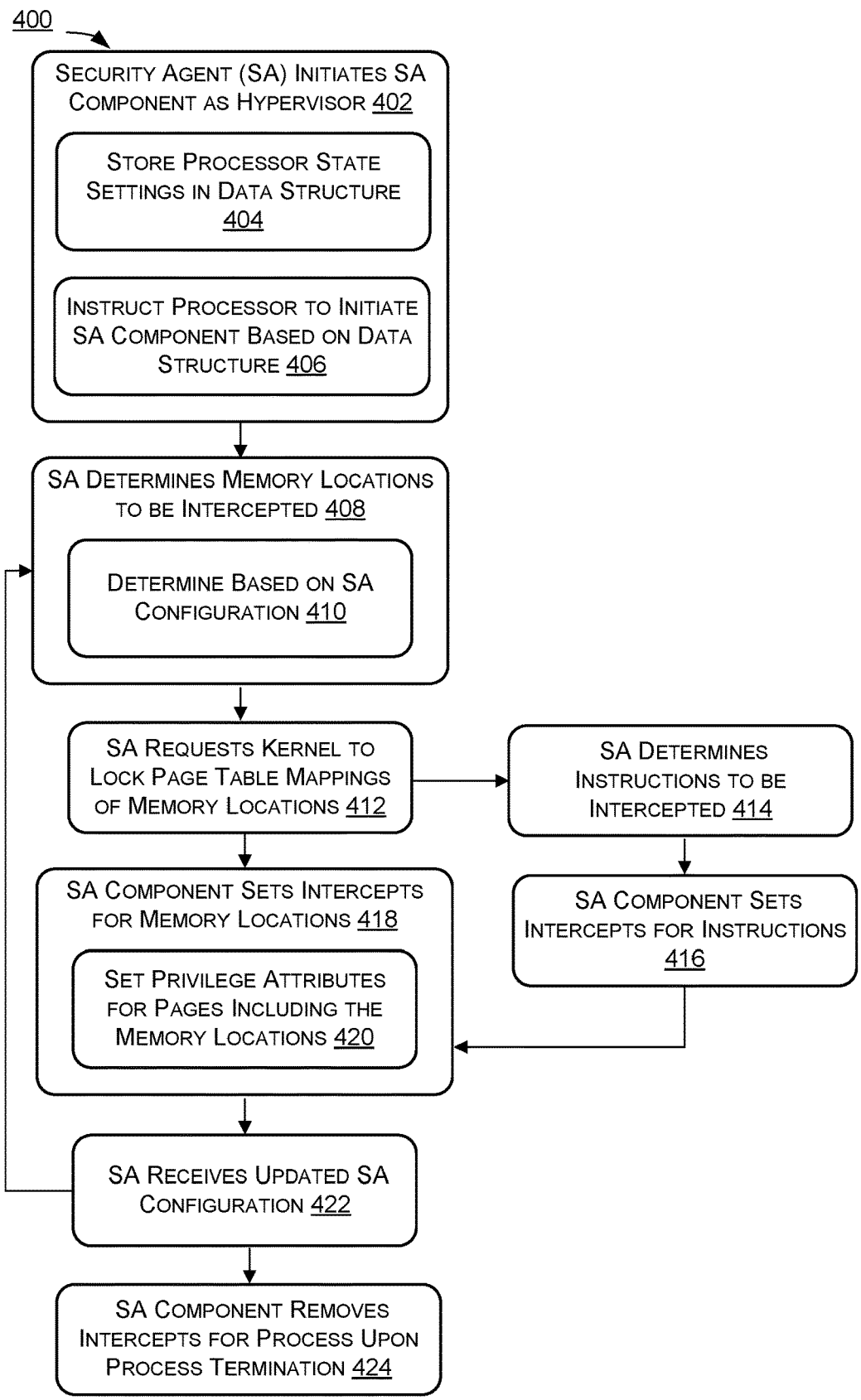
FIG. 4 illustrates an example process for initiating execution of a security agent component as a hypervisor for a computing device, determining memory locations of the computing device to be intercepted, and setting intercepts for the determined memory locations.
Figure 5:
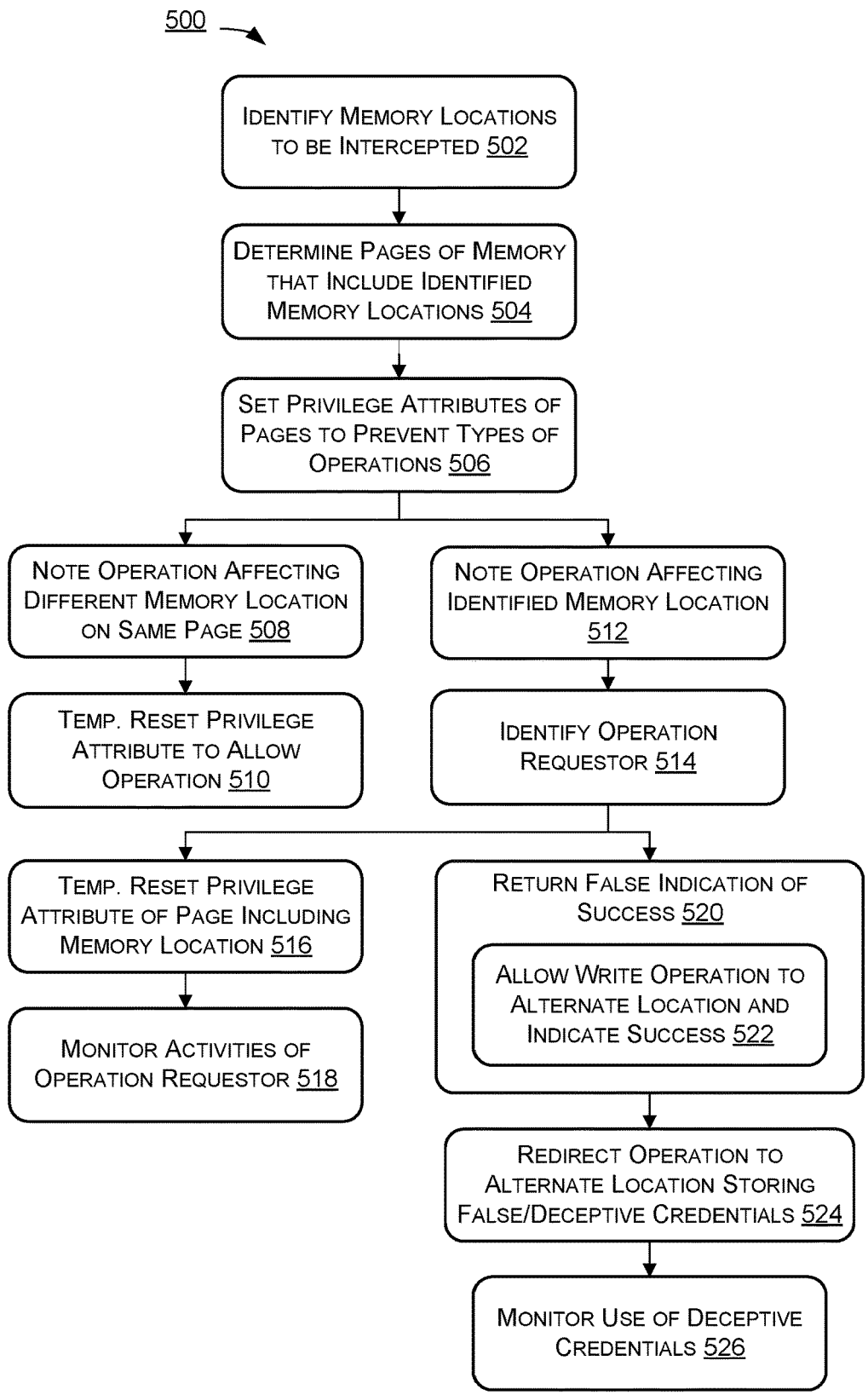
FIG. 5 illustrates an example process for protecting memory locations through privilege attributes of pages while enabling operations on other memory locations associated with those pages.

FIGS. 4-5 illustrate example processes 400 and 500. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 illustrates an example process for initiating execution of a security agent component as a hypervisor for a computing device, determining memory locations of the computing device to be intercepted, and setting intercepts for the determined memory locations. The process 400 includes, at 402, a security agent on a computing device initiating a security agent component as a hypervisor for the computing device. The initiating may include, at 404, storing processor state settings in a data structure and, at 406, instructing a processor of the computing device to initiate the security agent component as the hypervisor based on the data structure. In some implementations, the security agent may include different routines for different operating systems, each of the different routines fixing as invariant a part of the data structure associated with the respective different operating system.

At 408, the security agent may then determine a subset of memory locations in the memory to be intercepted. At 410, the security agent may determine the subset based on a security agent configuration received from a security service.

At 412, the security agent may request that an operating system kernel of the computing device lock page table mappings of the memory locations of the subset of memory location.

At 414, the security agent may determine instructions to be intercepted and, at 416, the security agent component mat set intercepts for the determined instructions. The operations at 414 and 416 may also be performed before the operations show at 408-412 or concurrently with those operations.

At 418, the security agent component may set intercepts for memory locations of the determined subset of memory locations. At 420, setting the intercepts may include setting privilege attributes for pages which include the memory locations of the determined subset of memory locations, or it may include changing the physical memory location of such pages.

At 422, the security agent may receive an updated security agent configuration and, without rebooting, repeat the determining of the subset of memory locations at 408 and cause the security agent component to repeat the setting of the intercepts at 418.

At 424, the security agent component may remove intercepts corresponding to a process upon termination of the process.

FIG. 5 illustrates an example process for protecting memory locations through privilege attributes of pages while enabling operations on other memory locations associated with those pages. The process 500 includes, at 502, identifying memory locations of a subset of memory locations in memory of the computing device to be intercepted. In some implementations, the identified memory locations include a memory location associated with privileges for a process. In further implementations, the identified memory locations include a memory location associated with user credentials.

At 504, pages of the memory which include the identified memory locations may then be determined.

At 506, privilege attributes of the pages may then be set to prevent specific types of operations from affecting the memory locations. When the identified memory locations include a memory location associated with privileges for a process, the specific types of operations may include write operations and the setting includes setting the privilege attribute for the page including the memory location to a read only value to prevent writes to the memory location. When the identified memory locations include a memory location associated with user credentials, the specific types of operations may include read operations and setting includes setting the privilege attribute for the page including the memory location to an inaccessible value to prevent reads of the memory location.

At 508, an operation affecting another memory location associated with one of the pages which differs from the identified memory location associated with that page may be noted.

At 510, the privilege attribute of the one of the pages may then be temporarily reset to allow the operation.

Before, during, or after the operations shown at 508-510, an operation affecting the identified memory location may, at 512, be noted.

At 514, a process, thread, or module that requested the operation may then be identified.

At 516, responsive to noting the operation at 512, the privilege attribute of the page including the one of the identified memory locations may be temporarily reset to allow the operation. At 518, after temporarily resetting the privilege attribute, activities of the process, thread, or module may be monitored.

At 520, responsive to noting the operation at 512, a false indication of success for the operation may be returned. At 522, returning the false indication of success includes allowing the write operation to an alternate memory location and returning an indication that the write operation was successful. At 524, the read operation may be redirected to be performed on an alternate memory location storing false or deceptive user credentials. At 526, use of the deceptive credentials may then be monitored. In some implementations, redirecting to an alternate memory location may involve copying contents of the page including the identified memory location to a page which includes the alternate memory location storing the false or deceptive user credentials.

Figure 6:
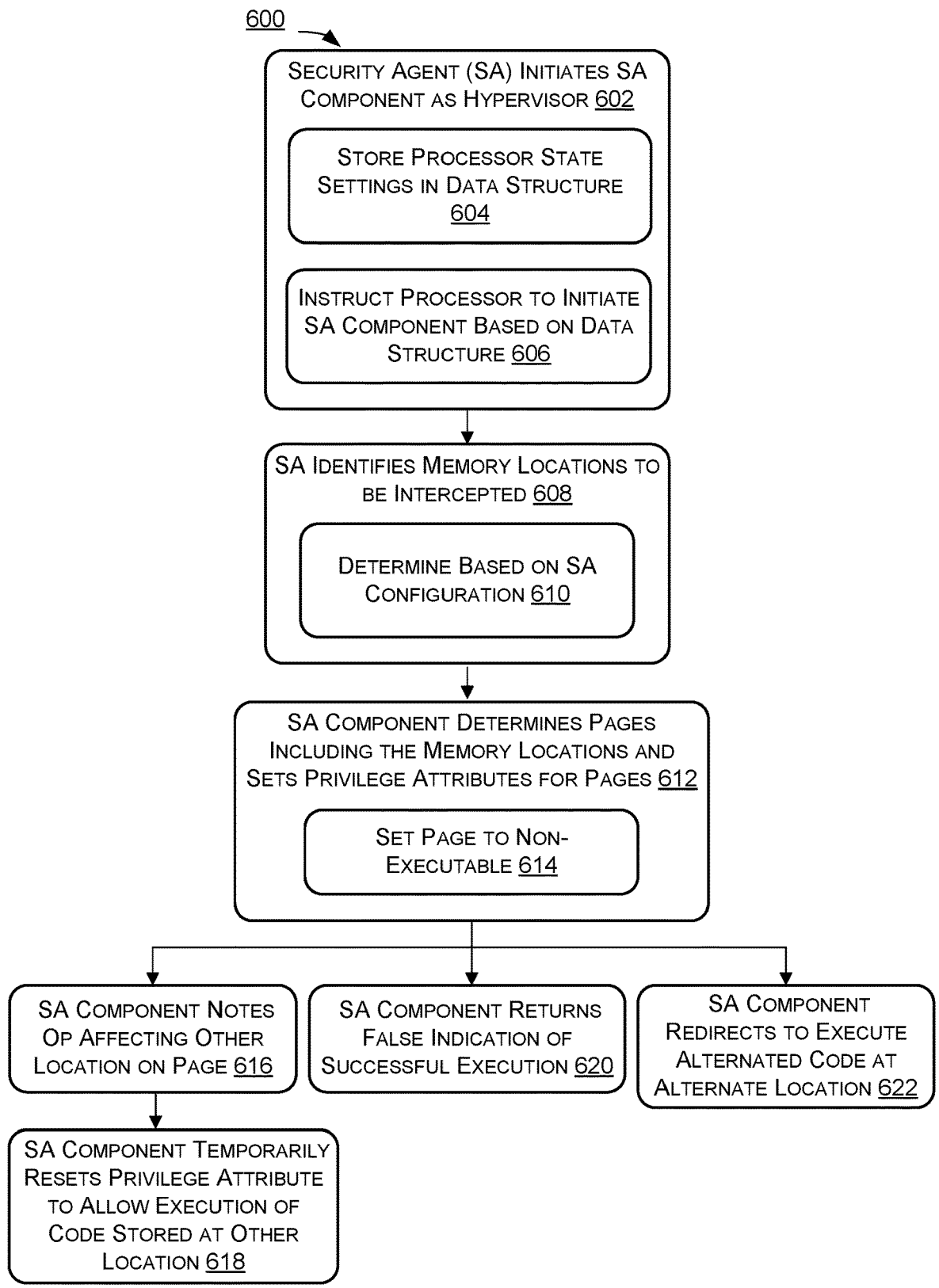
FIG. 6 illustrates an example process for determining memory locations to be intercepted and setting privilege attributes for memory pages including those memory locations, including setting a memory page to non-executable.

FIG. 6 illustrates an example process for determining memory locations to be intercepted and setting privilege attributes for memory pages including those memory locations, including setting a memory page to non-executable. The process 600 includes, at 602, a security agent on a computing device initiating a security agent component as a hypervisor for the computing device. The initiating may include, at 604, storing processor state settings in a data structure and, at 606, instructing a processor of the computing device to initiate the security agent component as the hypervisor based on the data structure.

At 608, the security agent may then identify memory locations in the memory to be intercepted. At 610, the security agent may identify those memory locations based on a security agent configuration received from a security service.

At 612, the security agent component then determines pages of memory that include the identified memory locations and sets privilege attributes for those pages to prevent specific types of access to the memory locations. For example, at 614, the security agent component may set at least one of the pages to non-executable to prevent execution of code stored at an identified memory location included in that page.

At 616, the security agent component may note an operation affecting another memory location associated with one of the pages which differs from an identified memory location associated with that page. For instance, the operation may involve execution of code stored at the other memory location. At 618, the security agent component may then temporarily reset the privilege attribute of the page to allow the execution of the code stored at the other memory location.

Alternatively, or additionally, at 620, the security agent component may return a false indication of success to a process seeking to execute the code stored at an identified memory location.

Alternatively, or additionally, at 622, the security agent component may cause an execute operation intended for the code stored at an identified memory location to be performed on other code stored at an alternate memory location.

Alternatively, or additionally, at 624, the security agent component may prohibit the execute operation and/or kill the process the executed or is deemed responsible for the execute operation.

Figure 7:
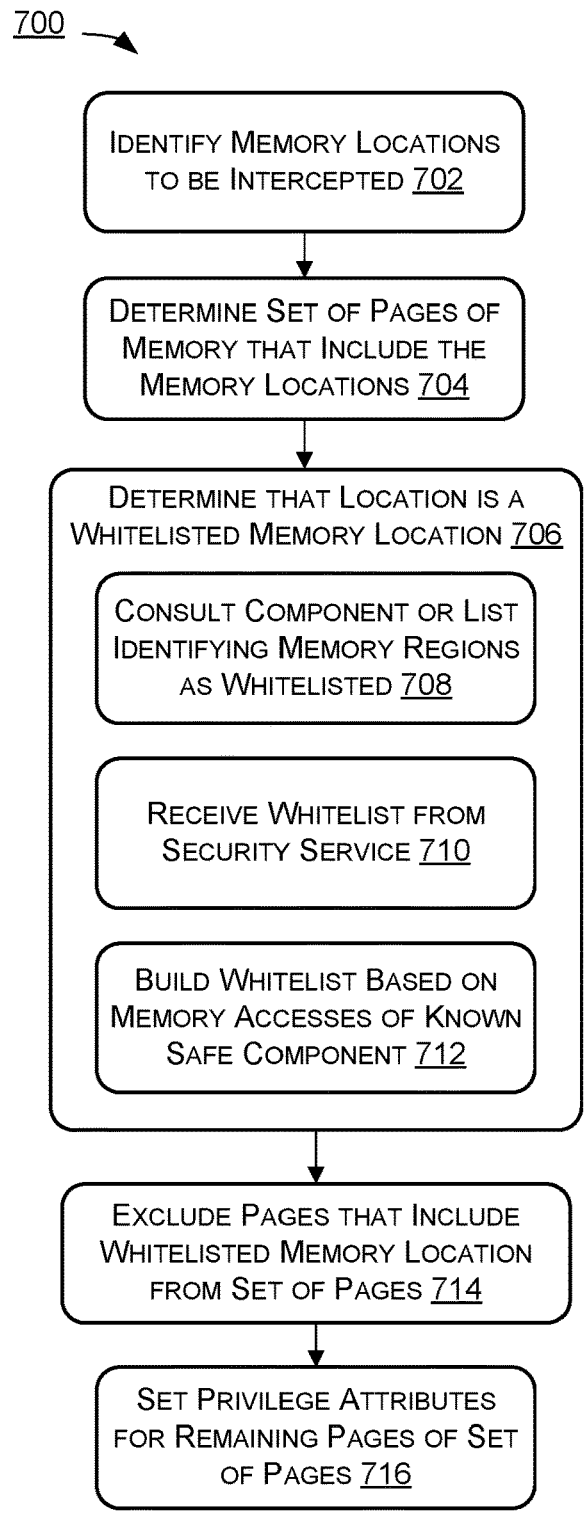
FIG. 7 illustrates an example process for determining that a memory location is whitelisted and excluding memory page(s) that include the whitelisted memory location from a set of pages to have their privilege attributes changed.

FIG. 7 illustrates an example process for determining that a memory location is whitelisted and excluding memory page(s) that include the whitelisted memory location from a set of pages to be intercepted. The process 700 includes, at 702, a security agent on a computing device initiating a security agent component as a hypervisor for the computing device and identifying memory locations in memory of the computing device to be intercepted.

At 704, the security agent component determines a set of pages of the memory, each of the pages include at least one of the identified memory locations.

At 706, the security agent component then determines that one of the memory locations is a whitelisted memory location. At 708, the determining may include consulting a component or list identifying different memory regions of the memory and indicating which memory regions are whitelisted. At 710, the determining may additionally or alternatively include receiving the list of different memory regions that are whitelisted from a security service. At 712, the determining may additionally or alternatively include building a list of whitelisted memory locations based on memory accesses of a known safe component.

At 714, the security agent component then excludes one or more pages that include a whitelisted memory location from the set of pages.

At 716, the security agent component then sets privilege attributes for remaining pages of the set of pages to prevent specific types of operations from affecting memory locations included in those pages.

At 718, the security agent component notes an operation effecting a memory location included in a remaining page of the set of pages, determines whether the memory location is a whitelisted memory location, and, in response to determining that the memory location is a whitelisted memory location, permits the operation.

Figure 8:
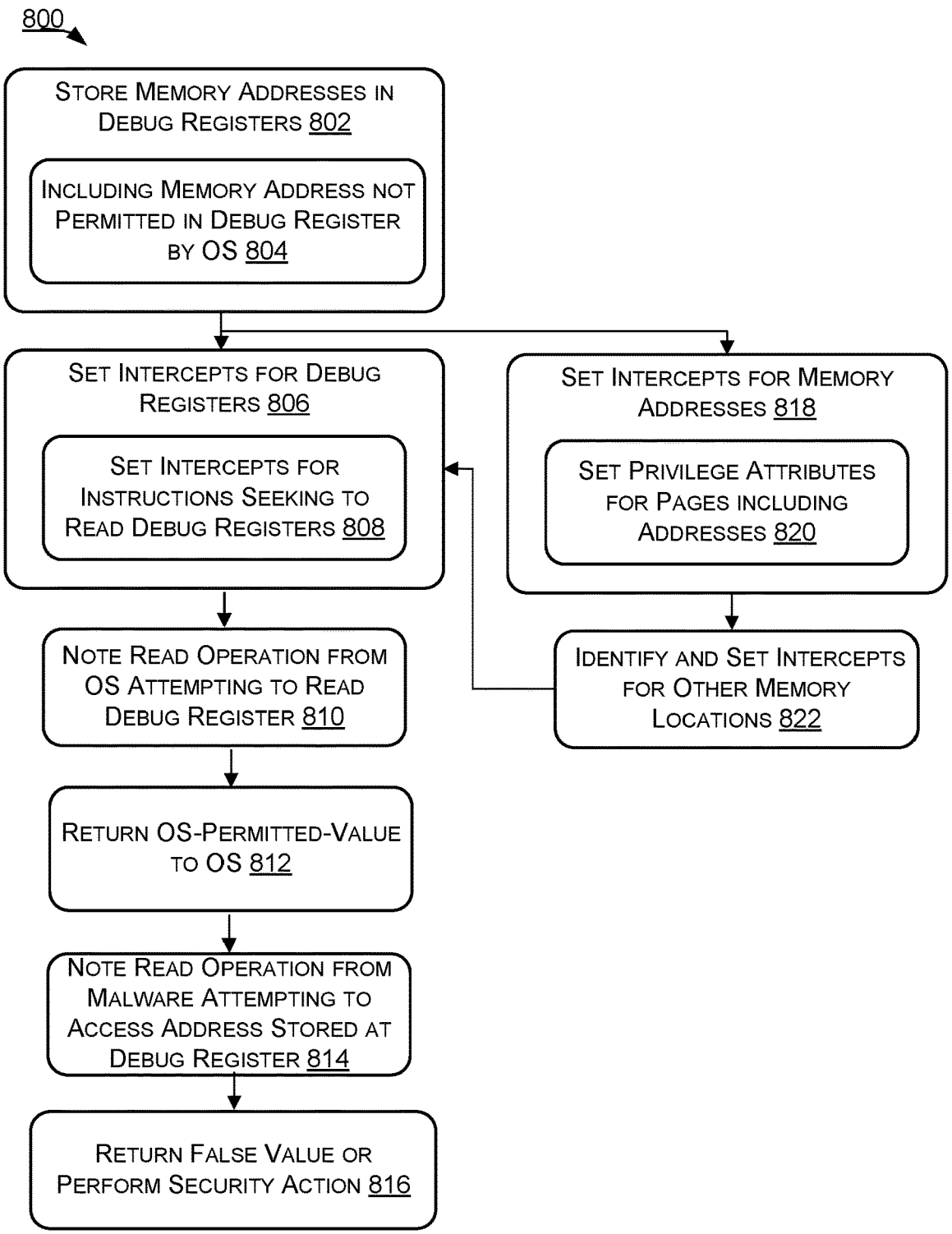
FIG. 8 illustrates an example process for intercepting accesses of debug registers and, when such accesses are from the operating system, responding with operating-system-permitted values.

FIG. 8 illustrates an example process for intercepting accesses of debug registers and, when such accesses are from the operating system, responding with operating-system-permitted values. The process 800 includes, at 802, a security agent on a computing device storing memory addresses in debug registers. At 804, such memory addresses may include memory addresses not permitted in a debug register by the operating system of the computing device. Such a memory address not permitted by the operating system to be stored in the debug registers may, for example, be associated with a kernel-mode component. Further, the security agent may initiate a security agent component as a hypervisor for the computing device.

At 806, the security agent component sets intercepts for the debug registers. At 808, setting the intercepts may include setting intercepts for instructions seeking to read the debug registers.

At 810, the security agent component notes a read operation from the operating system attempting to read one of the debug registers. At 812, in response to noting the read operation, the security agent component returns an operating-system-permitted value for the one of the debug registers to the operating system.

At 814, the security agent component may note a read operation from malware attempting to read one of the memory addresses stored in a corresponding one of the debug registers and, at 816, in response, return a false value to the malware or perform a security action.

At 818, the security agent component may further set intercepts for the memory addresses stored in the debug registers. At 820, the setting may include setting privilege attributes for memory pages which include the memory addresses.

At 822, the security agent may further identify other memory locations to be intercepted, and the security agent component may set privilege attributes for memory pages that include the other memory locations.

Figure 9:
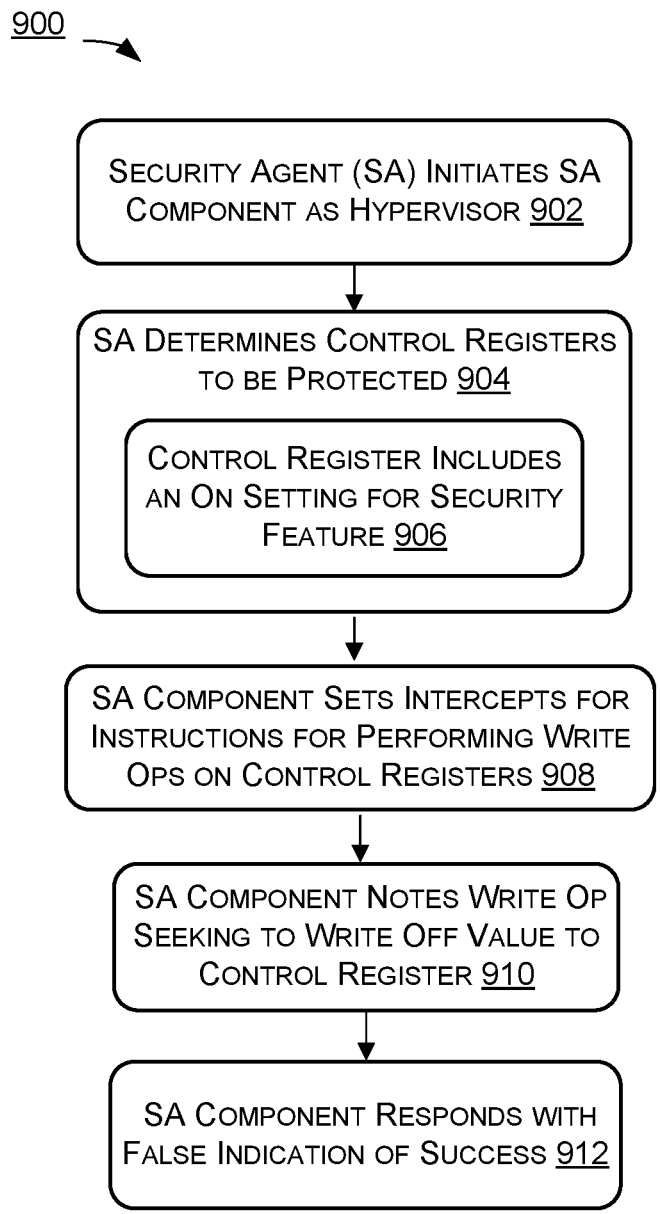
FIG. 9 illustrates an example process for intercepting instructions for accessing control registers.

FIG. 9 illustrates an example process for intercepting instructions for accessing control registers. The process 900 includes, at 902, a security agent on a computing device initiating a security agent component as a hypervisor for the computing device.

At 904, the security agent then determines control registers of the computing device to be protected. Such control registers may include, at 906, a control register storing an on setting for a security feature of the computing device.

At 906, the security agent component then sets intercepts for instructions for performing write operations on the control registers.

At 908, the security agent component further notes a write operation seeking to write an off value to the control register storing the on setting for the security feature. At 910, the security agent component responds to the write operation with a false indication that the security feature has been set to the off value, kills the process or thread requesting the write operation, and/or remembers the fact that the process or thread requested the write operation, which can be used for further analysis.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method comprising:
   storing memory addresses of control registers of an operating system of the computing device in debug registers or model specific registers (MSRs) of the computing device, the memory addresses including a memory address not permitted by the operating system to be stored in the debug registers or MSRs;
   determining control registers to be protected;
   setting intercepts for the memory addresses stored in the debug registers or MSRs;
   monitoring a read operation from malware attempting to read one of the memory addresses stored in a corresponding one of the debug registers or MSRs;
   in response to monitoring the read operation from the malware attempting to read the one of the memory addresses:
   returning deceptive data to the malware that provides a false indication of success to the malware, and performing a security action including killing the read operation from the malware;

monitoring a write operation attempting to write an off value to one of the control registers to be protected, the off value turning off a security feature that prevents a processor of the operating system from performing write operations on the control registers; and in response to monitoring the write operation attempting to write the off value to the one of the control registers to be protected:

allowing the write operation to write the off value to an alternate memory location different from the memory addresses of the control registers, and returning a false indication that the security feature has been set to the off value.

2. The computer-implemented method of claim 1, further comprising setting privilege attributes for memory pages which include the memory addresses.

3. The computer-implemented method of claim 2, further comprising identifying other memory locations to be intercepted and setting privilege attributes for memory pages that include the other memory locations.

4. The computer-implemented method of claim 1, wherein setting the intercepts for the memory addresses stored in the debug registers or MSRs comprises setting intercepts for instructions seeking to read the debug registers or MSRs.

5. The computer-implemented method of claim 1, wherein the memory address not permitted by the operating system to be stored in the debug registers or MSRs is associated with a kernel-mode component.

6. The computer-implemented method of claim 1, wherein in response to monitoring the write operation attempting to write the off value to the one of the control registers further comprises at least one of: killing the write operation, or remembering that the process sought to write the off value.

7. The computer-implemented method of claim 6, wherein the one of the control registers includes an on setting for a security feature of the operating system.

8. The computer-implemented method of claim 1, wherein the computer-implemented method is performed by a security agent on the computing device.

9. The computer-implemented method of claim 8, wherein the security agent initiates a security agent component as a hypervisor for the computing device.

10. The computer-implemented method of claim 1, further comprising:

monitoring a read operation from the operating system attempting to read one of the debug registers or MSRs; and in response to monitoring the read operation from the operating system, returning an operating-system-permitted value corresponding to a memory address permitted by the operating system for the one of the debug registers or MSRs to the operating system.

11. A non-transitory computer-readable medium having stored thereon executable instructions which, when executed by a computing device, cause the computing device to perform operations comprising:

storing memory addresses of control registers of an operating system of the computing device in debug registers or model specific registers (MSRs) of the computing device, the memory addresses including a memory address not permitted by the operating system to be stored in the debug registers or MSRs;

determining control registers to be protected;

setting intercepts for the memory addresses stored in the debug registers or MSRs;

monitoring a read operation from malware attempting to read one of the memory addresses stored in a corresponding one of the debug registers or MSRs;

in response to monitoring the read operation from the malware attempting to read the one of the memory addresses:

returning deceptive data to the malware that provides a false indication of success to the malware, and performing a security action including killing the read operation from the malware;

monitoring a write operation attempting to write an off value to one of the control registers to be protected, the off value turning off a security feature that prevents a processor of the operating system from performing write operations on the control registers;

in response to monitoring the write operation attempting to write the off value to the one of the control registers to be protected:

allowing the write operation to write the off value to an alternate memory location different from the memory addresses of the control registers, and returning a false indication that the security feature has been set to the off value.

12. The non-transitory computer-readable medium of claim 11, wherein the operations further comprise setting privilege attributes for memory pages which include the memory addresses.

13. The non-transitory computer-readable medium of claim 12, wherein the operations further comprise identifying other memory locations to be intercepted and setting privilege attributes for memory pages that include the other memory locations.

14. The non-transitory computer-readable medium of claim 11, wherein setting the intercepts for the debug registers or MSRs comprises setting intercepts for instructions seeking to read the debug registers or MSRs.

15. The non-transitory computer-readable medium of claim 11, wherein the memory address not permitted by the operating system to be stored in the debug registers or MSRs is associated with a kernel-mode component.

16. The non-transitory computer-readable medium of claim 11, wherein the operations further comprise:

monitoring a read operation from the operating system attempting to read one of the debug registers or MSRs; and in response to monitoring the read operation from the operating system, returning an operating-system-permitted value corresponding to a memory address permitted by the operating system for the one of the debug registers or MSRs to the operating system.

17. A computing device comprising:

a processor; and memory coupled to the processor, the memory storing thereon executable instructions which, when executed by processor, cause the processor to perform operations, the operations comprising:

storing memory addresses of control registers of an operating system of the computing device in debug registers or model specific registers (MSRs) of the computing device, the memory addresses including a memory address not permitted by the operating system to be stored in the debug registers or MSRs;

determining control registers to be protected;

setting intercepts for the memory addresses stored in the debug registers or MSRs;

monitoring a read operation from malware attempting to read one of the memory addresses stored in a corresponding one of the debug registers or MSRs;

in response to monitoring the read operation from the malware attempting to read the one of the memory addresses:

returning deceptive data to the malware that provides a false indication of success to the malware, and performing a security action including killing the read operation from the malware;

monitoring a write operation attempting to write an off value to one of the control registers to be protected, the off value turning off a security feature that prevents a processor of the operating system from performing write operations on the control registers;

in response to monitoring the write operation attempting to write the off value to the one of the control registers to be protected:

allowing the write operation to write the off value to an alternate memory location different from the memory addresses of the control registers, and returning a false indication that the security feature has been set to the off value.

18. The computing device of claim 17, wherein the operations are performed by a security agent on the computing device, and the security agent initiates a security agent component as a hypervisor for the computing device.

* * * * *